US009762389B2

(12) United States Patent
Smedman et al.

(10) Patent No.: US 9,762,389 B2
(45) Date of Patent: Sep. 12, 2017

(54) MODERATION OF NETWORK AND ACCESS POINT SELECTION IN AN IEEE 802.11 COMMUNICATION SYSTEM

(71) Applicant: ANYFI NETWORKS AB, Malmö (SE)

(72) Inventors: Björn Smedman, Malmö (SE); Johan Almbladh, Lund (SE)

(73) Assignee: Anyfi Networks AB, Malmö (SE)

( * ) Notice: Subject to any disclaimer, the term of this patent is extended or adjusted under 35 U.S.C. 154(b) by 277 days.

(21) Appl. No.: 14/394,376

(22) PCT Filed: Apr. 15, 2013

(86) PCT No.: PCT/EP2013/057840
§ 371 (c)(1),
(2) Date: Oct. 14, 2014

(87) PCT Pub. No.: WO2013/153232
PCT Pub. Date: Oct. 17, 2013

(65) Prior Publication Data
US 2015/0071271 A1    Mar. 12, 2015

Related U.S. Application Data

(60) Provisional application No. 61/686,836, filed on Apr. 13, 2012.

(51) Int. Cl.
*H04L 9/14* (2006.01)
*H04W 48/18* (2009.01)
(Continued)

(52) U.S. Cl.
CPC ............ *H04L 9/14* (2013.01); *H04W 12/04* (2013.01); *H04W 12/06* (2013.01); *H04W 48/18* (2013.01);
(Continued)

(58) Field of Classification Search
None
See application file for complete search history.

(56) References Cited

U.S. PATENT DOCUMENTS

2002/0022483 A1    2/2002 Thompson
2002/0132603 A1*   9/2002 Lindskog .......... H04W 52/0232
                                                455/343.4
(Continued)

FOREIGN PATENT DOCUMENTS

WO    2010145882    12/2010

*Primary Examiner* — Ajay Cattungal
*Assistant Examiner* — Gautam Sharma
(74) *Attorney, Agent, or Firm* — Spruce Law Group, LLC

(57) ABSTRACT

A method for use in a front-end network communications device, arranged to operate as an access point, for establishing a data connection between a mobile communications terminal and one or more data communications networks comprises receiving, from the mobile communications terminal, a service provider request comprising a MAC address of the mobile communications terminal; sending, to a master server, request information pertaining to the service provider request; receiving, from the master server, a policy message comprising a visibility policy, said visibility policy containing rules for controlling the visibility of at least one of the one or more data communications networks; determining a subset of communications networks that should be visible to the mobile communications terminal based on said rules; and enforcing said visibility policy by allowing said mobile communications terminal to connect only to said subset of data communications networks.

23 Claims, 11 Drawing Sheets

(51) Int. Cl.
*H04W 12/04* (2009.01)
*H04W 12/06* (2009.01)
*H04W 84/12* (2009.01)
*H04W 88/08* (2009.01)
H04W 8/18 (2009.01)
H04W 88/10 (2009.01)
H04L 29/06 (2006.01)

(52) U.S. Cl.
CPC ............ *H04W 84/12* (2013.01); *H04W 88/08* (2013.01); *H04L 63/0892* (2013.01); *H04L 2209/24* (2013.01); *H04L 2209/80* (2013.01); *H04L 2463/061* (2013.01); *H04W 8/18* (2013.01); *H04W 88/10* (2013.01)

(56) References Cited

U.S. PATENT DOCUMENTS

| | | | |
|---|---|---|---|
| 2005/0021717 A1* | 1/2005 | Tomizawa | H04L 61/2015 709/223 |
| 2013/0095789 A1* | 4/2013 | Keevill | H04W 12/06 455/411 |

* cited by examiner

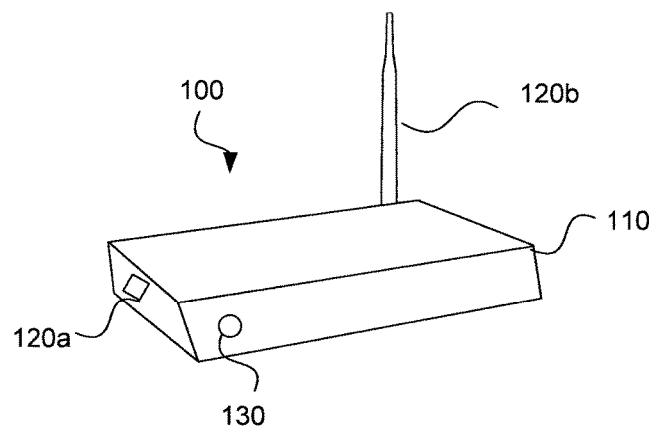
Fig. 1
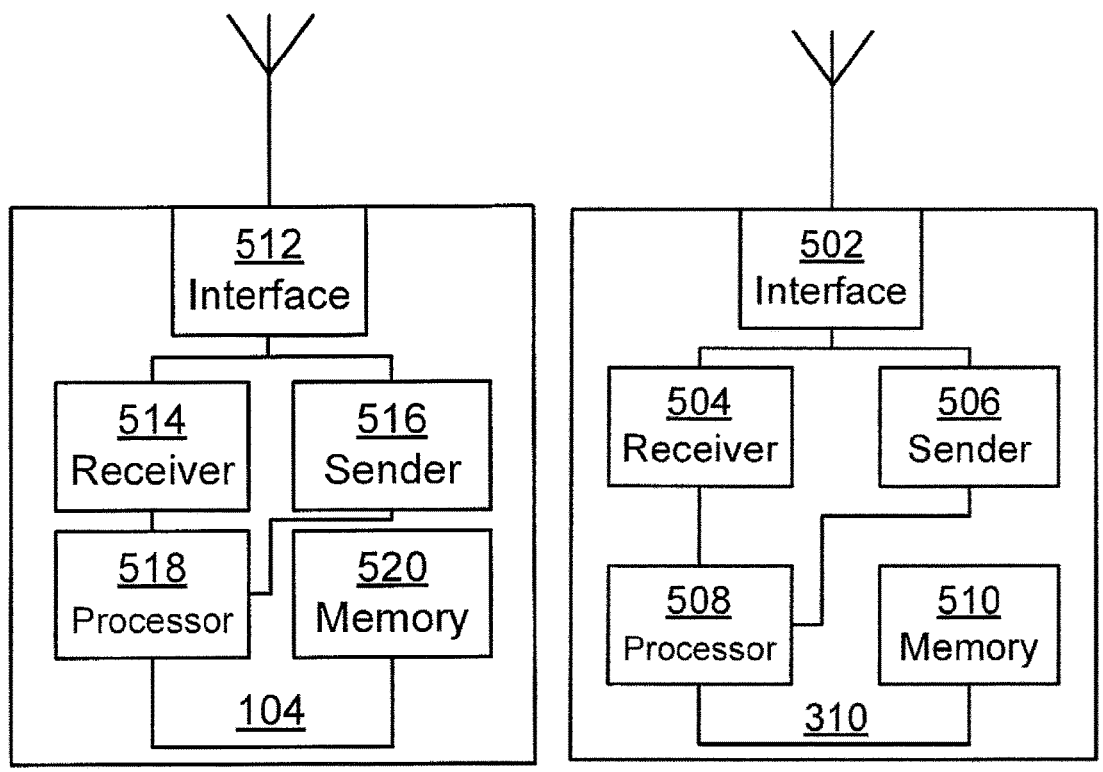
Fig. 2A                    Fig. 2B

MODERATION OF NETWORK AND ACCESS POINT SELECTION IN AN IEEE 802.11 COMMUNICATION SYSTEM

TECHNICAL FIELD

This application relates to a method, a network communication device, such as an access point, a master server and a computer-readable medium comprising instructions for improved resource handling in a communication system.

BACKGROUND

There are hundreds of millions of Wi-Fi access points in the world today, serving billions of devices. To an increasing extent these access points are being used not only to provide access to Local Area Networks, but also to provide carrier-class data communication services e.g. for offloading Universal Mobile Telecommunications System (UMTS) and Long Term Evolution (LTE) networks. IEEE 802.11 however was not originally designed as a carrier-grade radio access technology and lacks some functionality necessary to ensure a high average session quality of experience in a carrier context. For example IEEE 802.11 assumes that the device will handle network and access point selection.

One problem may be that some devices have not been engineered with large-scale communication systems in mind and may select access points and networks poorly when presented with more choices than is typical in a residential or corporate Wi-Fi context.

One problem may be that the device may not have information about the state of the network, e.g. the current load on various network elements, and may therefore select networks and access points in a manner leading to suboptimal performance for the mobile user.

One problem may be that the device may not have information about the traffic flow in the network or the associated costs for the service provider, and may therefore select networks and access points in a, for the mobile user or their service provider, economically suboptimal manner.

One problem may be that some access points may have an important primary function, e.g. providing access to a Local Area Network; that the mobile device's potential use of said access point is for a less important secondary purpose; and that the mobile device's selection of the access point may negatively impact users of the primary function.

Furthermore, it may seem that a simple fixed bandwidth limit for mobile devices would be sufficient to prevent negative impact to users of the primary function but this is unfortunately not the case. The average radio link quality for mobile devices tends to be quite low and large amounts of spectrum are therefore consumed even at modest throughput. Unless radio resources are carefully managed a mobile device can severely impact the user experience of a residential subscriber even at low data rates.

For example, it would not be uncommon for a mobile device to have such a low quality radio link that its maximum unthrottled throughput would be just 1 Mbps, or even less. A primary user of the access point that normally enjoys throughput of up to 50 Mbps would then be severely impacted even if mobile device's bandwidth use is quite low. Table 3 and table 4 provide some examples.

While prior art IEEE 802.11 communication systems that control access point selection (but not network selection) in a corporate Wi-Fi context exist these have poor scalability in a carrier Wi-Fi context. One reason may be that they attempt to tightly control access point selection requiring extensive synchronization between large numbers of access points. One reason may be that they do not efficiently use the distributed processing power of access points and mobile devices. These prior art systems typically scale only to thousands of access points. The technology disclosed here in contrast moderates both access point and network selection, without extensive synchronization, and scales to millions of access points, and beyond.

Furthermore, while prior art systems that solve or attempt to solve the problems above using custom software installed on the mobile device these systems typically lead to poor subscriber uptake and service provider economics. One reason may be that few subscribers go through the trouble of installing the custom software. One reason may be that the service provider must maintain and distribute custom software for a large number of different mobile device platforms.

There is thus a need for a scalable manner of moderating the access point and network selection of a mobile communications terminal.

SUMMARY

It is an object of the teachings of this application to overcome the problems listed above by providing a method for use in a front-end network communications device, arranged to operate as an access point, (100A, 104) for establishing a data connection (430) between a mobile communications terminal (102, 420) and one or more data communications networks (108, 400), said method comprising: receiving, from the mobile communications terminal (102, 420), a service provider request comprising a MAC address of the mobile communications terminal (102, 420); sending, to a master server (310, 410), request information pertaining to the service provider request; receiving, from the master server (310, 410), a policy message comprising a visibility policy, said visibility policy containing rules for controlling the visibility of at least one of the one or more data communications networks; determining a subset of communications networks (108, 400) that should be visible to the mobile communications terminal (102, 420) based on said rules; and enforcing said visibility policy by allowing said mobile communications terminal (102, 420) to connect only to said subset of data communications networks (108, 400), whereby the network selection of said mobile communications terminal (102, 420) is moderated.

It is also an object of the teachings of this application to overcome the problems listed above by providing a front-end network communications device to be used in a communication network according to above, said communication network comprising a master server and a mobile communications terminal, wherein said front-end network communications device is configured to establish a data connection between a mobile communications terminal and one or more data communications networks, said front-end network communications device being configured for executing the method above.

It is also an object of the teachings of this application to overcome the problems listed above by providing a method for use in a master server (410, 310) arranged to be used in a communications network (108, 400) comprising a plurality of front-end network communications devices (100A, 104), for establishing a data connection (430) between a mobile communications terminal (102, 420) and one or more data communications networks (108, 400), said method comprising receiving, from said at least one of the front-end network communications devices (100A, 104), request information pertaining to a service provider request received by said at least one of the front-end network communications devices (100A, 104) and said service provider request comprising a MAC address of said mobile communications terminal (102, 420); generating visibility policy rules based on the request information received from at least one of the front-end network communications devices (100A, 104); sending to at least one of the front-end network communications devices (100A, 104) one or more policy messages comprising said visibility policy rules; and thereby enabling at least one of the front-end network communications devices (100A, 104), based on said one or more policy messages; determining, by each of said at least one of the front-end network communications devices (100A, 104) a subset of communications networks (108, 400) that should be visible to the mobile communications terminal (102, 420) based on said rules and enforcing, by each of said at least one front-end network communications devices said visibility policy rules by allowing said mobile communications terminal (102, 420) to connect only to said subset of data communications networks (108, 400), whereby the network and access point selection of the mobile communications device (102, 420) is moderated.

It is also an object of the teachings of this application to overcome the problems listed above by providing a computer-readable storage medium encoded with instructions that, when executed on a processor, performs the method according to above.

It is also an object of the teachings of this application to overcome the problems listed above by providing a master server (410, 310) arranged to be used in a communications network (108, 400) comprising a plurality of front-end network communications devices (100A, 104), for establishing a data connection (430) between a mobile communications terminal (102, 420) and one or more data communications networks (108, 400), said master server being configured for: receiving, from said at least one of the front-end network communications devices (100A, 104), request information pertaining to a service provider request received by said at least one of the front-end network communications devices (100A, 104) and said service provider request comprising a MAC address of said mobile communications terminal (102, 420); generating visibility policy rules based on the request information received from at least one of the front-end network communications devices (100A, 104); sending to at least one of the front-end network communications devices (100A, 104) one or more policy messages comprising said visibility policy rules; and thereby enabling at least one of the front-end network communications devices (100A, 104), based on said one or more policy messages; determining, by each of said at least one of the front-end network communications devices (100A, 104) a subset of communications networks (108, 400) that should be visible to the mobile communications terminal (102, 420) based on said rules and enforcing, by each of said at least one front-end network communications devices said visibility policy rules by allowing said mobile communications terminal (102, 420) to connect only to said subset of data communications networks (108, 400), whereby the network and access point selection of the mobile communications device (102, 420) is moderated.

It is also an object of the teachings of this application to overcome the problems listed above by providing a computer-readable storage medium encoded with instructions that, when executed on a processor, performs any of the methods according to above.

Other features and advantages of the disclosed embodiments will appear from the following detailed disclosure, from the attached dependent claims as well as from the drawings.

Generally, all terms used in the claims are to be interpreted according to their ordinary meaning in the technical field, unless explicitly defined otherwise herein.

All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF DRAWINGS

The invention will be described in further detail under reference to the accompanying drawings in which:

FIG. 1 shows a schematic view of a network communication device, such as an access point, according to one embodiment of the teachings of this application;

FIG. 2A shows a schematic view of the general structure of a network communication device, such as an access point, according to one embodiment of the teachings of this application;

FIG. 2B shows a schematic view of the general structure of a master server according to one embodiment of the teachings of this application;

DETAILED DESCRIPTION

Figure 3:
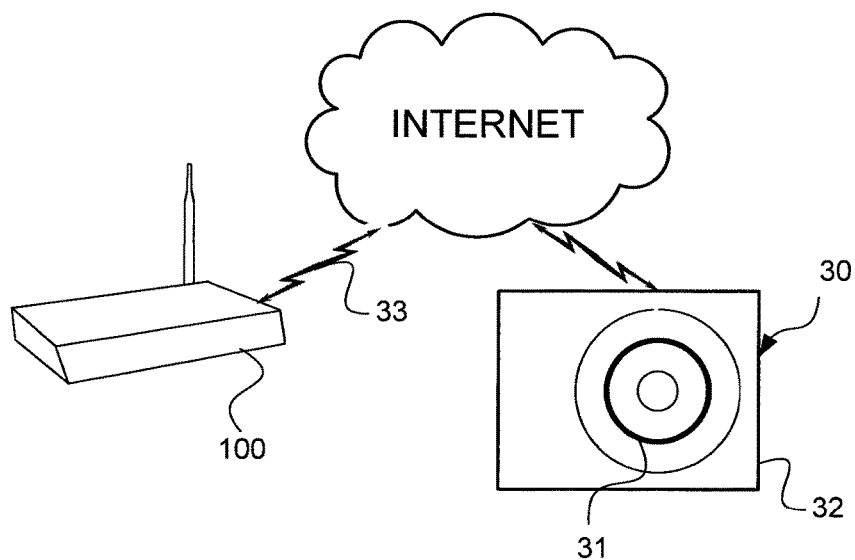
FIG. 3 shows a schematic view of a computer-readable medium comprising instructions according to one embodiment of the teachings of this application.

The disclosed embodiments will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

More details on the underlying technology for communication systems such as disclosed herein are to be found in the two international patent applications referenced by WO 2010/0145882 and PCT/EP2011/070586. The terminology of the two applications differs somewhat from the terminology of this application. The master server of the two applications is referred to herein as a master server or matchmaking service. An access point of the two applications is referred to herein as an access point or a radio front-end. A service provider server of the two applications is referred to herein as a tunnel termination back-end. The two international applications are incorporated herein by reference and a reader is invited to study either of the two international applications for further details on how to implement a general communication system as disclosed herein.

FIG. 1 shows a network communication apparatus 100 according to an embodiment herein. In one embodiment the network communication apparatus 100 is configured for network communication, wireless and/or wired. In one embodiment the network communication apparatus 100 is configured for network communication, both wireless and wired. In one embodiment the network communication apparatus 100 functions as an access point (AP). Examples of such a network communication apparatus 100 are a router and a bridge.

The network communication apparatus 100 will hereafter be exemplified and described as being a router 100. The router 100 comprises a housing 110 comprising a controller or CPU (not shown) and one or more computer-readable storage mediums (not shown), such as storage units and internal memory. Examples of storage units are disk drives or hard drives. The router 100 further comprises at least one data port 120. Data ports can be wired and/or wireless. An example of a wired data port is an Ethernet port 120a. An example of a wireless data port is a radio frequency based data port 120b based on the IEEE 802.11 standard, that is, a Wi-Fi port. Data ports are configured to enable a terminal 100 to connect with other routers or a server. They are also configured for enabling the router 100 to communicate with one or more mobile communications terminals such as a mobile phone, a computer tablet or a laptop computer. In one embodiment the mobile communications terminal is Wi-Fi enabled. The router 100 may also comprise at least one input unit such as a button 130. Such a button 130 may for example be used to reset the router 100.

FIG. 2A shows a schematic view of the general structure of a router according to FIG. 1. The router may be a network communication device, and may be configured to operate as an access point 104. The router comprises a controller which is responsible for the overall operation of the router. The controller may be implemented using instructions that enable hardware functionality, for example, by using executable computer program instructions in a general-purpose or special-purpose processor that may be stored on a computer-readable storage medium (disk, memory etc) to be executed by such a processor.

The router 100, 104 may comprise a wired interface, which is adapted to allow the terminal to communicate with other devices such a server for a service provider. Examples of such wired technologies are USB, Ethernet, Local Area Network, TCP/IP (Transport Control Protocol/Internet Protocol) to name a few.

The router further comprises wireless, such as a radio frequency, interface, which is adapted to allow the terminal to communicate with other devices through a radio frequency band through the use of different radio frequency technologies. Examples of such technologies are Wi-Fi, Bluetooth®, W-CDMA, GSM, UTRAN, LTE, NMT to name a few. It should be noted that for the purpose of this application the evolving communication standard commonly referred to as White-Fi is considered to be equivalent to the Wi-Fi in its operation and the teachings offered herein in relation to Wi-Fi and the IEEE 802.11 standard also extend to the White-Fi standard.

In order for the router 100, 1004 to function as a radio front-end the RF interface should have a Wi-Fi chipset with a software defined IEEE 802.11 Media Access Control (MAC) layer and preferably support for multiple BSSIDs. The Wi-Fi driver should also support a low level interface so that the technology disclosed herein can monitor the radio environment to detect the presence of a mobile device.

Further details on the front-en network communications device 100 are given below.

FIG. 2B shows a schematic illustration of a master server 310 according to the teachings herein.

The master server 310 comprises a controller which is responsible for the overall operation of the master server 310. The controller may be implemented using instructions that enable hardware functionality, for example, by using executable computer program instructions in a general-purpose or special-purpose processor that may be stored on a computer-readable storage medium (disk, memory etc) to be executed by such a processor.

The master server 310 comprises a wired interface, which is adapted to allow the master server to communicate with other devices such as front-end and back-end network communications devices and other master servers. Examples of such wired technologies are USB, Ethernet, Local Area Network, TCP/IP (Transport Control Protocol/Internet Protocol) to name a few.

Further details on the master server 310 are given below.

FIG. 3 shows a schematic view of a computer-readable medium as described in the above. The computer-readable medium 30 is in this embodiment a data disc 30. In one embodiment the data disc 30 is a magnetic data storage disc. The data disc 30 is configured to carry instructions 31 that when loaded into a controller, such as a processor, executes a method or procedure according to the embodiments disclosed above. The data disc 30 is arranged to be connected to or within and read by a reading device 32, for loading the instructions into the controller. One such example of a reading device 32 in combination with one (or several) data disc(s) 30 is a hard drive. It should be noted that the computer-readable medium can also be other mediums such as compact discs, digital video discs, flash memories or other memory technologies commonly used.

The instructions 31 may also be downloaded to a computer data reading device 100, such as a router as the router 100 of FIG. 1 or other device capable of reading computer coded data on a computer-readable medium such as a computer, by comprising the instructions 31 in a computer-readable signal 33 which is transmitted via a wireless (or wired) interface (for example via the Internet) to the computer data reading device 100 for loading the instructions 31 into a controller (not shown explicitly in FIG. 3, but referenced 210 in FIG. 2). In such an embodiment the computer-readable signal 33 is one type of a computer-readable medium 30.

The instructions may be stored in a memory (not shown explicitly in FIG. 3, but referenced 240 in FIG. 2) of the router 100. The instructions may be contained in software modules or firmware modules.

In this manner the router 100 may be updated with new instructions and enabled for an updated operation. Both the software and/or the firmware may thus be updated remotely.

References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

Figure 4:
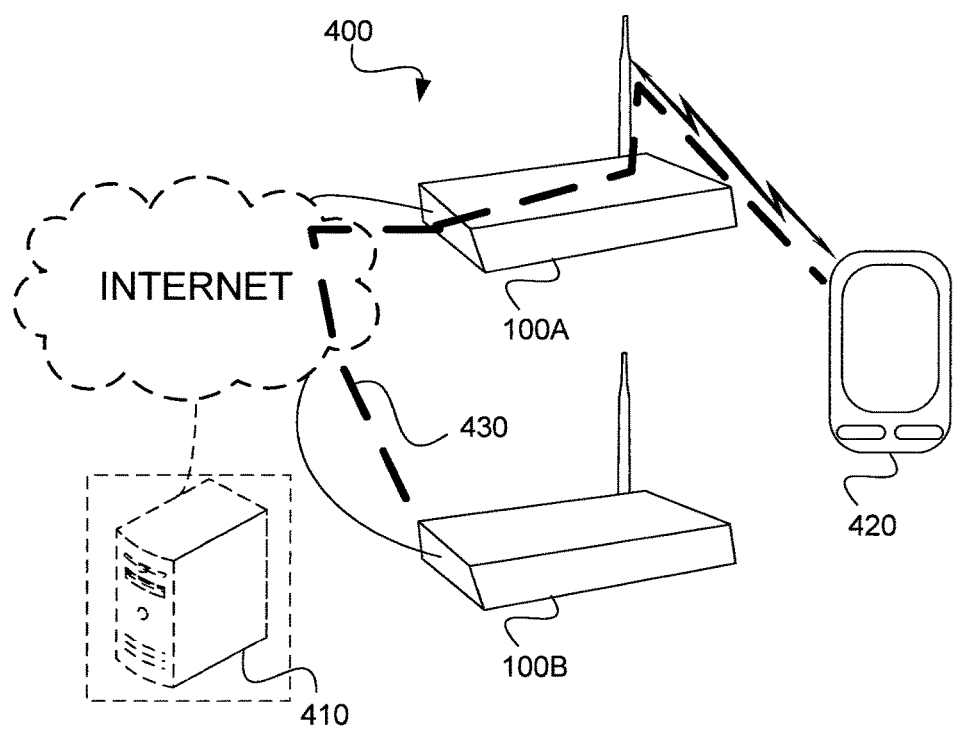
FIG. 4 shows a schematic view of a basic communication system according to one embodiment of the teachings of this application.
Figure 9:
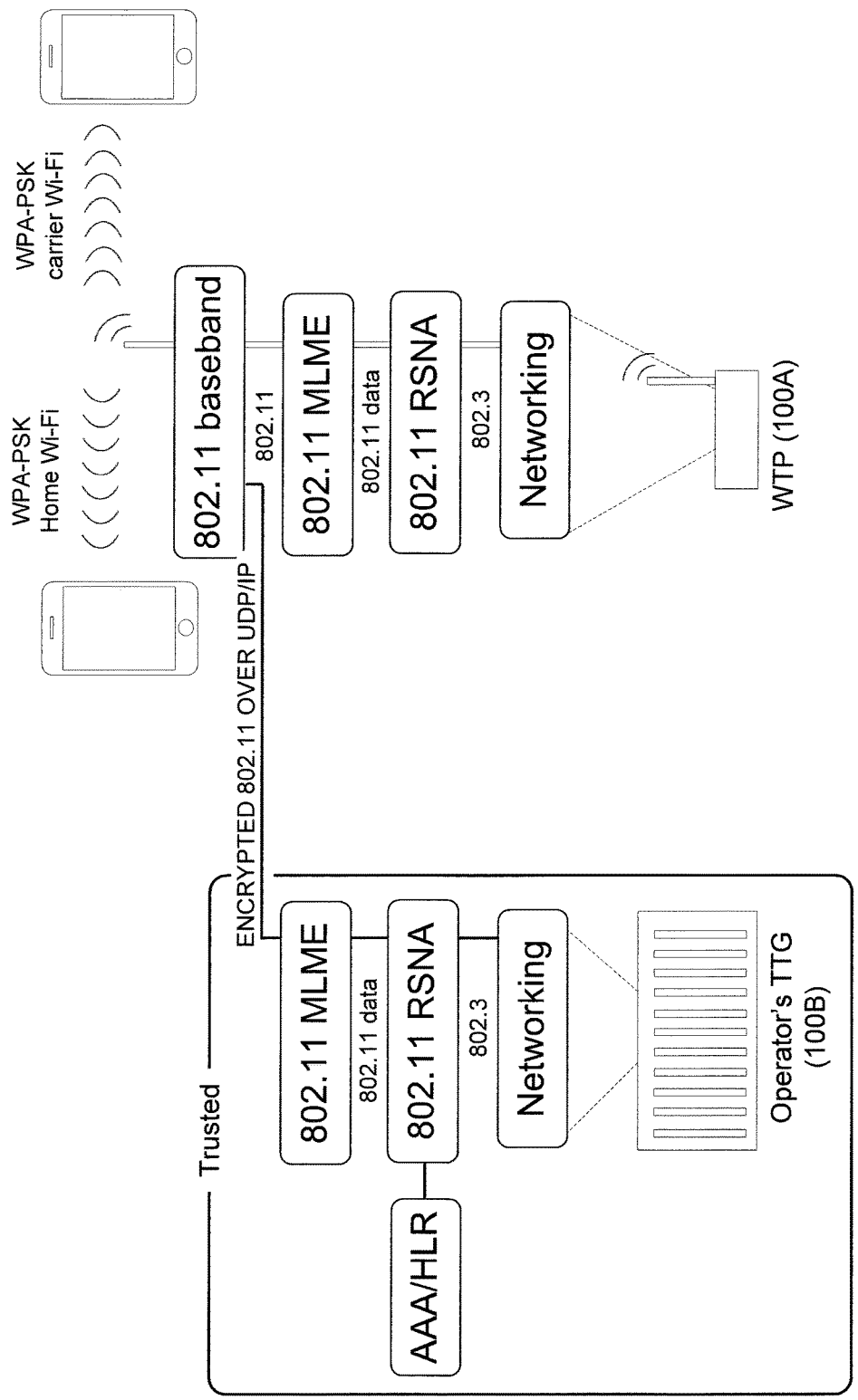
FIG. 9 shows a schematic view of a communication system according to one embodiment of the teachings of this application.

FIG. 4 shows a schematic overview of a basic communication system or network according to the teachings herein. The terms network and system will be used interchangeably herein. A front-end router 100A acting as an access point (AP) is connected via the internet to a master server 410, possibly via a wired interface indicated by the line going through the INTERNET cloud. A back-end router 100B acting as a home- or back-end access point is also connected to the master server 410. The front-end access point 100A may be connected to a mobile communications terminal also referred to herein as a mobile device 420, such as a smartphone, a computer tablet or a laptop computer. Preferably the mobile communications terminal is Wi-Fi enabled. The master server 410 acts as a matchmaking server for enabling a data tunnel 430 to be established between the front-end access point 100A and the back-end access point 100B. Note however that the data tunnel 430 may also connect the front-end access point 100A to a termination gateway (TTG) as illustrated in FIG. 9. The functions of a system such as the system of FIG. 4 will now be described in greater detail.

To enable a router 100 for operation as a front-end 100A according to the technology herein public access point vendors only need to integrate the radio front-end software.

It should be noted that the example network of FIG. 4 is only for illustrative and exemplifying purposes. The technology herein also works well with a communication network 400 in which the back-end network communications device 100B is optional. Such a communication network 400 may be a network comprising a front-end network communications device 100A and which is connected to one or more data communication networks, e.g. separate Virtual Local Area Networks (VLANs) on an Ethernet network.

Alternative embodiments of communications system 400 or communication network will now be described with reference to FIGS. 5A and 5B. Reference is also made to the FIGS. 3, 4 and 5a, 5b and 5c of the published and incorporated international patent application WO 2010145882. For further details on the workings of a communication network 400 or any of the comprised components, relating to the structure, functionality and/or cooperation of the components, reference is given to the published and incorporated international patent application WO 2010145882.

Figure 5A:
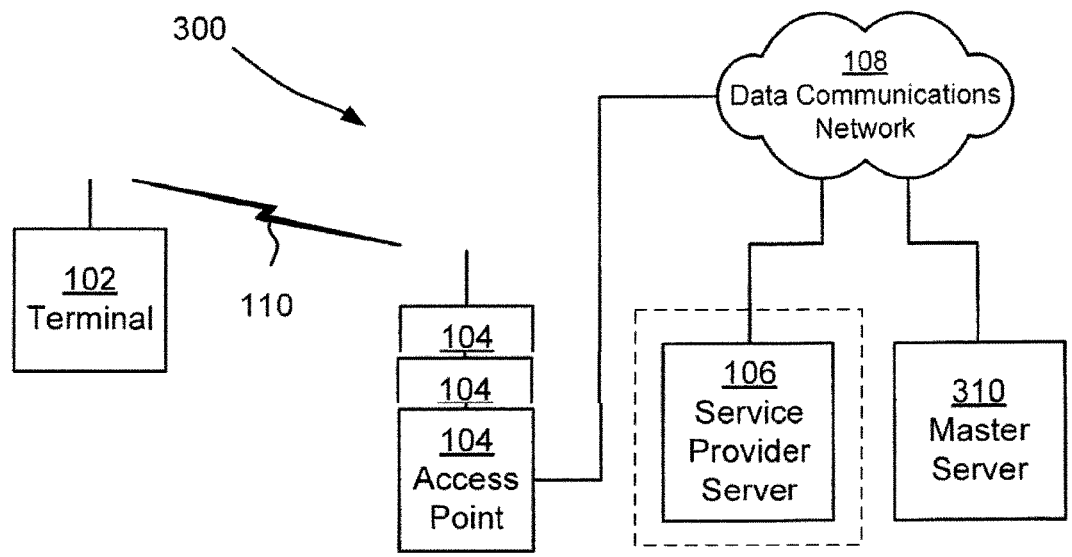
FIGS. 5A and 5B each shows a schematic view of a communication system according to one embodiment of the teachings of this application.

One embodiment of a communications system 400 is illustrated in FIG. 5A. The communications system 400 comprises a terminal 102, one or more access points 104, a service provider server 106, a data communications network 108 and a so-called master server 310. The access point 104 may be implemented as a network communications device 100A according to FIG. 1 or FIG. 2A. As stated above the mobile communications terminal 102 may be a computer, a personal digital assistant, a mobile communications device or the like, such as the mobile communications terminal 420 of FIG. 4. The master server 310 may be a master server such as the master server 410 of FIG. 4 or FIG. 2B. The mobile communications terminal may conform to the IEEE 802.11 standard. The present invention does not require an IEEE 802.11 compatible terminal to be modified. The access point 104 is configured to be operatively connected to both the service provider server 106 and the master server 310 via the data communications network 108.

It should be noted that the service provider server 106 is optional in the communication system 400 and a communication system excluding a service provider server 106 is also considered to be disclosed in FIG. 5A, as is indicated by the dashed box surrounding the service provider server 106.

FIG. 2B is a schematic illustration of internal components of a so-called master server 310 according to embodiments. In general terms the master server 310 is configured to perform operations associated with the process of operatively connecting a terminal to a data communications system, wherein the operations may comprise receiving request information pertaining to a service provider request, searching for available service providers based on the received request information, and sending acknowledgement information relating to available service providers. The master server 310 may also be configured to store information related thereto. The master server 310 comprises a communications interface 502. The communications interface 502 may be an antenna and/or a network socket, or the like, enabling the master server 310 to communicate with other entities in a communications system. The communications interface 502 is arranged to be in communication with a receiver 504 arranged to receive data messages and signals and with a sender 506 arranged to send data messages and signals. The receiver 504 and the sender 506 are arranged to be in communication with a processing unit 508. The processing unit 508 may be a Central Processing Unit (CPU). The processing unit 508 is further arranged to be in communication with a memory 510.

In a preferred embodiment the master server is implemented using several computer servers in a redundant high availability configuration. The communications interface is implemented as a network socket bound to an IP address reachable from a wide area network, such as the Internet.

FIG. 2A is a schematic illustration of internal components of an access point 104 according to embodiments. The access point 104 comprises a communications interface 512. The communications interface 512 may be an antenna and/or a network socket, or the like, enabling the access point 104 to communicate with other entities in a communications system. The communications interface 512 is arranged to be in communication with a receiver 514 arranged to receive data messages and signals and with a sender 516 arranged to send data messages and signals. The receiver 514 and the sender 516 are arranged to be in communication with a processing unit 518. The processing unit 518 may be a Central Processing Unit (CPU). The processing unit 518 is further arranged to be in communication with a memory 520.

In a preferred embodiment the access point is implemented using a low cost embedded system with two communications interfaces. The first communications interface used primarily for communication with the terminal comprises an IEEE 802.11 compatible radio with a software defined media access control (MAC) layer. Software control over the MAC layer makes it possible to realise the disclosed methods and devices using standard low cost IEEE 802.11 hardware. The second communications interface is used primarily for communication with the master server and comprises a network socket bound to an IP address from which the master server can be reached. An IP based second communications interface makes it possible to deploy an access point in any location with Internet access.

Figure 5B:
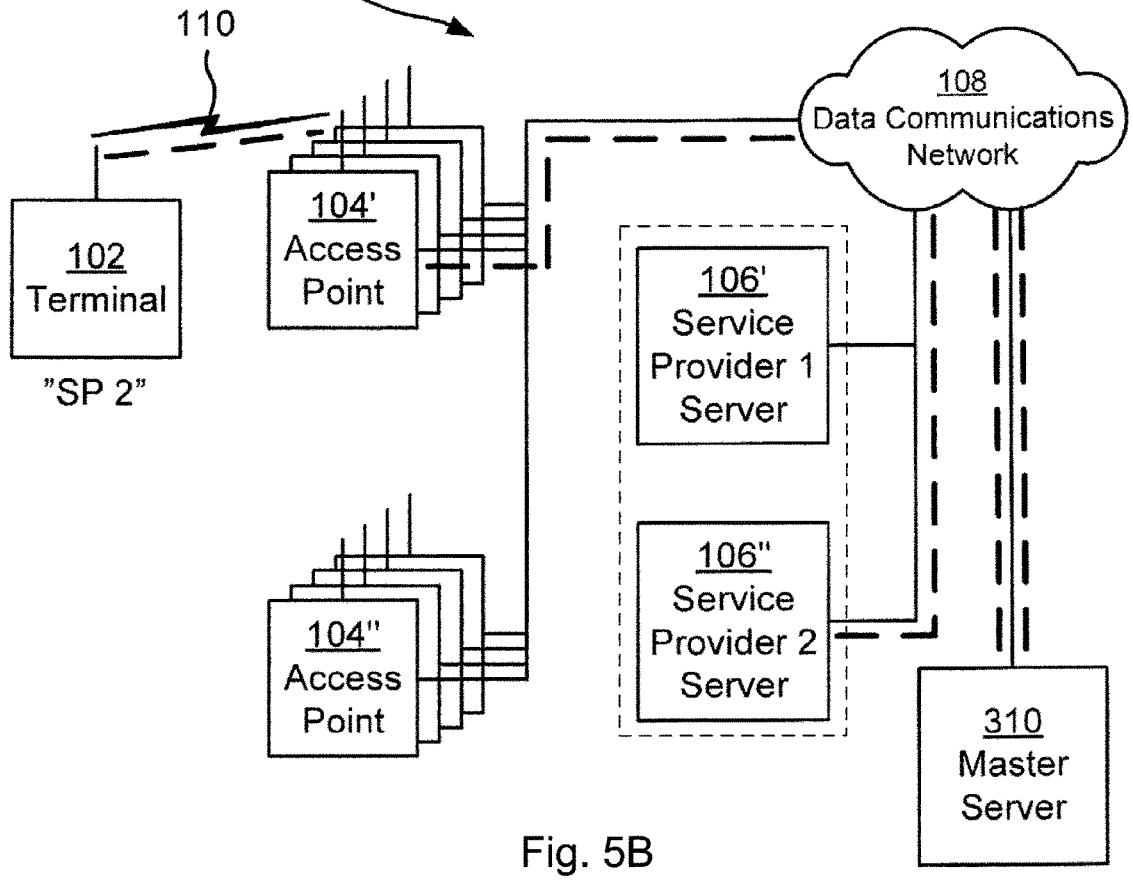

Another communications system 400 is illustrated in FIG. 5B. Similarly to the communications system 300 the communications system 400 comprises a terminal 102, a data communications network 108, and a master server 310. In contrast to the system 300 the system 400 further comprises a first plurality of access points, one of which is denoted by reference numeral 104', a second plurality of access points, one of which is denoted by reference numeral 104", a server 106' for a first service provider, and a server 106" for a second service provider. The first plurality of access points and the second plurality of access points are operatively connected to the master server 310.

For example, assume that the terminal 102 of FIG. 5B requests access to the data communications network 108 via a service provider associated with service provider server 106", as denoted by "SP 2". The service provider request is received by access point 104' associated with service provider server 106'. Access point 104' does not find the requested service provider in the service provider list and hence forwards the request to the master server 310. The master server 310 performs a lookup and finds service provider server 106" associated with the requested service provider. The master server 310 then forwards the request to service provider server 106". Thereafter the data traffic pertaining to the data connection from the terminal 102 and the data communications network 108 may be directed directly from the access point 104' to the service provider server 106" (i.e. without being directed via the service provider server 106' associated with the access point 104'). In FIG. 5B the associated data traffic paths are outlined by the dashed lines.

Throughout this application we use a number of technical terms that may need a short introduction. To the largest extent possible we try to use the standard IEEE 802.11 terms and definitions.

The technology herein enables leveraging existing infrastructure, e.g. residential gateways, to create mobile Wi-Fi services. But existing infrastructure is there for a reason—it has a primary function. For example a residential gateway has been designed to provide Internet access to a fixed-line subscriber in their home. We call this the primary function of the residential gateway. Safeguarding the primary function of an access point is our first priority. The strong security model and advanced spectrum aware prioritization are designed to protect it.

Public access point is our term for an IEEE 802.11 access point with the primary function of providing wireless Internet access in a public space. Public access points are often owned and managed by a service provider, e.g. a fixed-broadband or mobile operator, but are sometimes operated by a venue or roaming aggregator directly. The public access point may be one of the following (not limiting) a front-end network communications device 100A or an access point 104 or a router 100.

Corporate access point is our term for an IEEE 802.11 access point with the primary function of providing wireless access to a corporate LAN. Corporate access points are often, as the term implies, owned and managed by a corporation. The corporate access point may be one of the following (not limiting) a front-end network communications device 100A or an access point 104 or a router 100.

A residential gateway is for the purpose of this document an operator managed broadband gateway with an integrated IEEE 802.11 access point. Its primary function is to provide Internet access to a fixed-line broadband subscriber in their home. In some contexts this term may be interpreted to also refer to similar equipment used to provide Internet access to a small business.

A consumer Wi-Fi router is very similar to a residential gateway, except that it is not managed by the operator. The firmware in a consumer Wi-Fi router can only be updated by the consumer that owns it, or in some cases by the vendor.

Basic Service Set (BSS) is the IEEE 802.11 term for a wireless access point. Modern access points however often implement a Multi BSS (MBSS) feature allowing a single physical access point to imitate multiple access points. In IEEE 802.11 terminology such an access point supports multiple Basic Service Sets. A BSS is identified by a BSSID, which is represented as a MAC address.

Extended Service Set is the IEEE 802.11 term for a Local Area Network (LAN) segment with Layer 2 connectivity. A number of wireless access points may provide wireless access to such a network. In IEEE 802.11 terminology we would say that the ESS consists of one or several Basic Service Sets. An ESS is identified by an ESSID, which is a 32 character string also known as an SSID. Note though that while SSIDs should be locally unique they cannot be relied on as a globally unique identifier; there can be networks with the same SSID elsewhere in the world.

Wireless Termination Point (WTP) is used in this document to refer to an IEEE 802.11 access point providing radio access services to a mobile device. What distinguishes a WTP from an access point is that a WTP does not terminate the IEEE 802.11 protocol itself. It simply acts as a relay for raw IEEE 802.11 frames, receiving them through a Wi-Fi over IP tunnel and sending them out on the local radio—and wise-versa in the opposite direction.

There is a one-to-one relationship between WTPs and radio front-ends. The difference is that WTP is used to refer to the physical device whereas radio front-end refers to the abstract architectural element. A front-end network communication device may thus be implemented as a WTP.

Analogous to the term WTP we refer to the physical equipment where the Wi-Fi over IP is terminated as the Tunnel Termination Point (TTP). In this case as well there is a one-to-one relationship between TTPs and tunnel termination back-ends. The difference is that TTP is used to refer to the physical device whereas tunnel termination back-end refers to the abstract architectural element. A back-end network communication device may thus be implemented as a Tunnel Termination Point.

Figure 6:
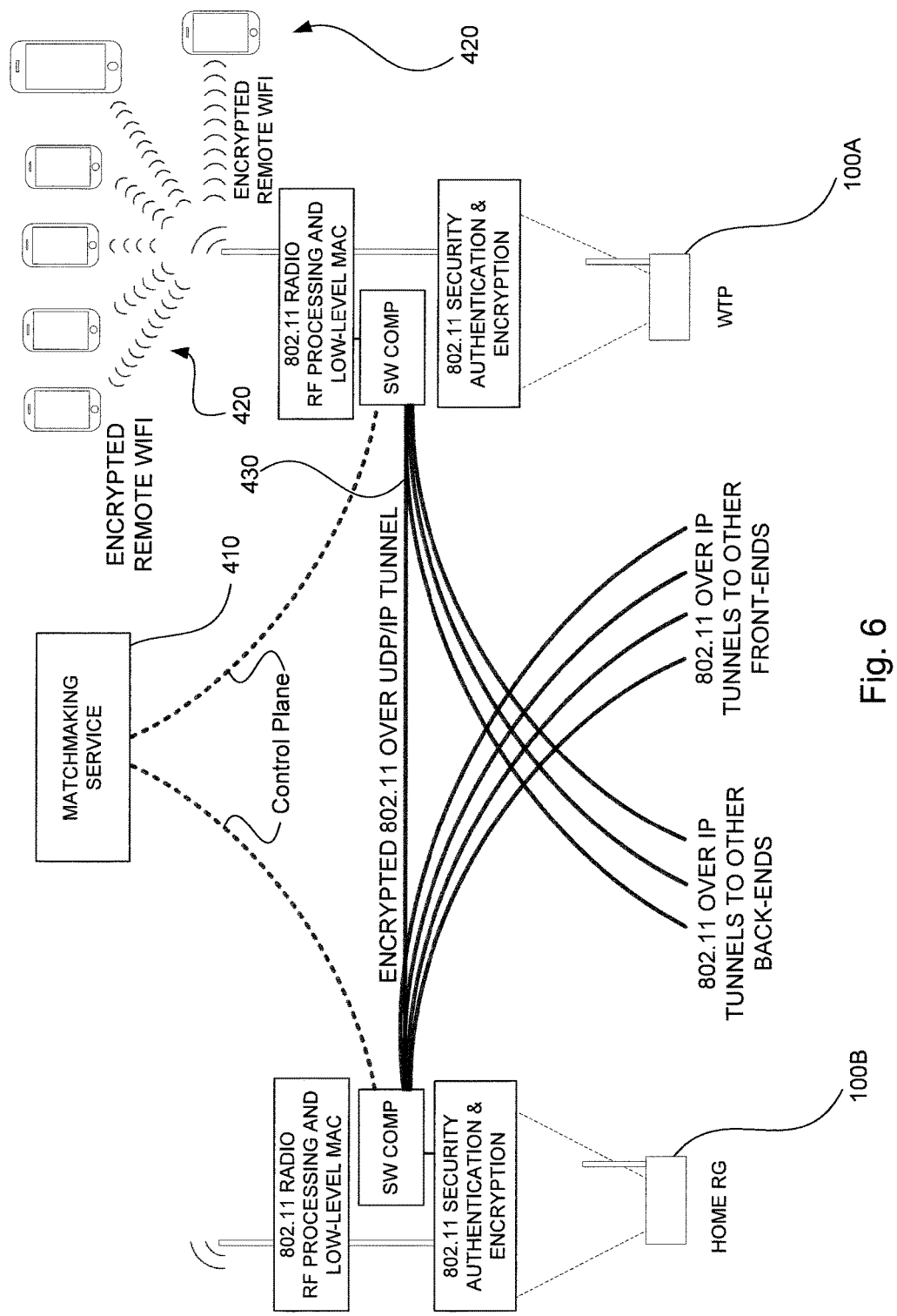
FIG. 6 shows a schematic view of a communication system according to one embodiment of the teachings of this application.

This architecture makes it possible to dynamically assemble complete Wi-Fi stacks which provide exactly the network each mobile device is looking for on demand. FIG. 6 shows a schematic view of a communication system arranged to implement the technology. The system disclosed in an architecture overview. Two access points 100A and 100B are shown in FIG. 6 with an enlarged view of their functional components. The Home AP 100B has a software component referred to as SW COMP in the figures which is a tunnel termination back-end daemon. The front-end AP 100A also has a software component referred to as SW COMP in the figures which is a radio front-end daemon. The daemons are arranged to communicate with a master server also referred to herein as a matchmaking service 410.

In one embodiment, the radio front-end 100A, such as the AP 100A of FIG. 4, has at least two main responsibilities: constantly monitoring the radio environment to detect when a mobile device comes within range and, when so instructed by the cloud-based matchmaking service, serving as a Wireless Termination Point (WTP) for some networks.

The radio front-end 100A handles the low level real-time critical aspects of the IEEE 802.11 protocol, e.g. sending acknowledgement frames and transmitting periodic beacons. The higher level MLME (Media Access Control (MAC) Sublayer Management Entity) and data frames are instead encapsulated in UDP/IP (User Datagram Protocol/Internet Protocol) datagrams and forwarded to the relevant tunnel termination back-end 100B. In this sense the front-end functions as a "dumb" radio; it simply forwards (often encrypted) IEEE 802.11 radio frames between its wired network interface and the Wi-Fi radio.

Adding radio front-end functionality to a public access point or residential gateway may be achieved through a remote firmware or software update as has been disclosed in relation to FIG. 3. The radio front-end software can of course also be factory installed e.g. in consumer Wi-Fi routers.

A tunnel termination back-end 100B functions almost exactly like a Wi-Fi access point, with one important difference: instead of sending and receiving IEEE 802.11 frames over a local radio it sends and receives them on its wired network interface, encapsulated in UDP/IP datagrams. The IEEE 802.11 frames may be sent through a data tunnel 430 as disclosed in relation to FIG. 4, the Tunnel Termination Gateway 430 of FIG. 6 being one example of such a tunnel.

The back-end 100B performs all the higher level functions of the IEEE 802.11 stack including authentication and encryption.

The tunnel termination software according to the technology disclosed herein can be deployed in a residential gateway as a remote firmware or software update or pre-installed in consumer Wi-Fi routers.

The cloud-based matchmaking service or master server 410 coordinates radio front-ends 100A and tunnel termination back-ends 100B and connects them to form complete IEEE 802.11 stacks on demand. It communicates with front-ends 100A and back-ends 100B with a lightweight UDP/IP based protocol in many ways similar to DNS (Domain Name System).

As can be seen in FIG. 6 a matchmaking or master server 410 may be arranged to handle a plurality of front-ends 100A all being connected to a plurality of back-ends 100B, which in turn may be connected to a plurality of front-ends, each connection having a data tunnel 430. In an example an explanation of the operation of the system will be given by a step-by-step description of a complete use-case which will show how the parts fit together.

For the purposes of this walkthrough imagine you are a fixed-line broadband subscriber and your ISP (Internet Service Provider) has provided you with a Wi-Fi equipped residential gateway containing and configured to operate according to the technology disclosed herein.

Figure 7A:
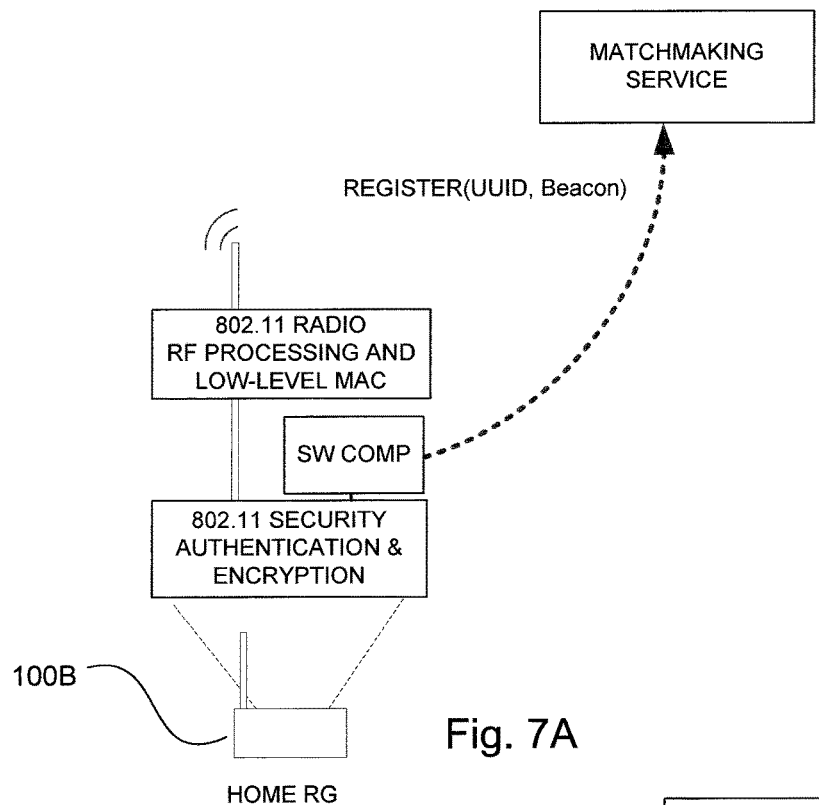
FIGS. 7A, 7B, 7C and 7D each shows a schematic view of a communication system according to one embodiment of the teachings of this application.

FIG. 7A shows an example of a back-end 100B according to one embodiment of the teachings herein, also referred to as a residential gateway (Residential GW). When a residential gateway arranged with the technology disclosed herein boots up it sends a registration message (Register UUID, Beacon) to the cloud-based matchmaking service.

When the user's residential gateway starts up the embedded tunnel termination back-end software will send a registration message to the cloud-based matchmaking service containing a UUID identifying the user's home Wi-Fi network and a template that can be used to generate an IEEE 802.11 Beacon frame for this network. If this is the first time the matchmaking service receives a registration message from the user's gateway it will create a database entry to represent the user's network. It will also store the beacon template and make note of the source IP address and UDP port number of the registration message.

The first time a new device, such as a mobile communications terminal 420, is connected to the residential gateway a Bind message containing the MAC address of the device is sent to the cloud-based matchmaking service.

Figure 7B:
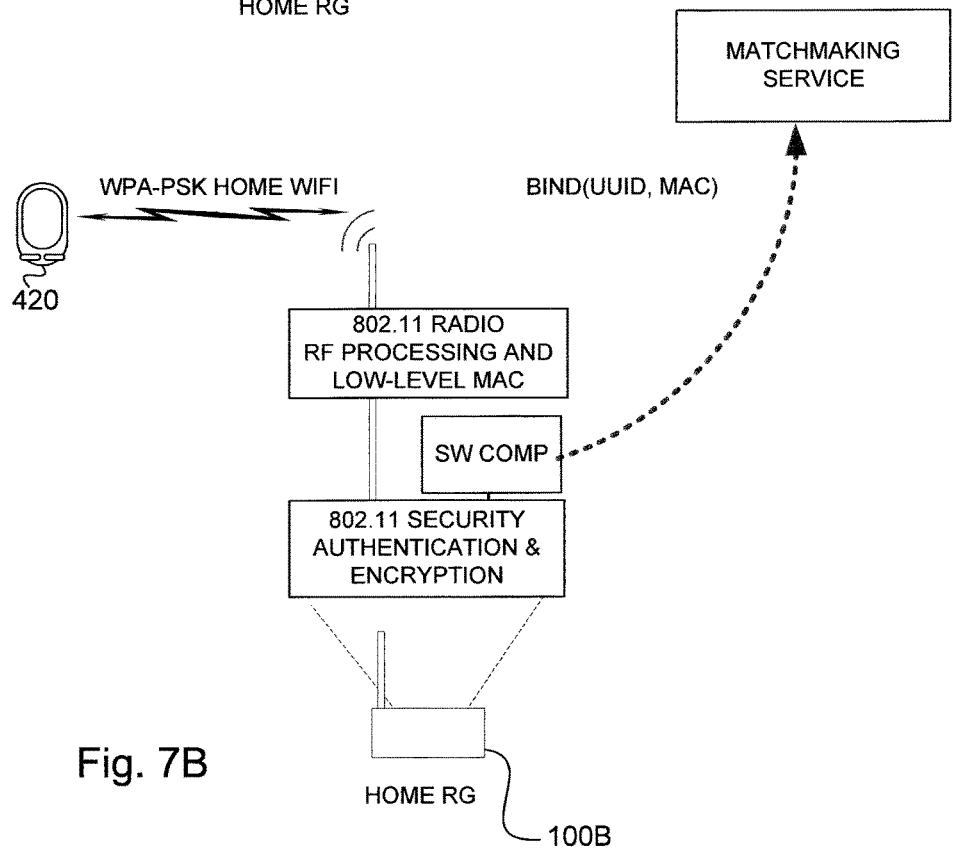

When a user connects a new device 420 to his home Wi-Fi network through his residential gateway 100B for the first time the tunnel termination back-end software will send another message, a Bind message, to the cloud-based matchmaking service, this time containing the MAC address of your device and the UUID identifying your home Wi-Fi network. See FIG. 7B.

The matchmaking service uses this information to create a database entry representing the user's device and a database entry encoding the Binding, i.e. the user's device's preference for the user's home Wi-Fi network.

When the user attempts to use the device in a new location the device may send out a service provider request in the form of one or more IEEE 802.11 Probe Request frames, one or more IEEE 802.11 Authentication frames, one or more IEEE 802.11 Association Request frames and/or one or more IEEE 802.11 Reassociation Request frames.

Figure 7C:
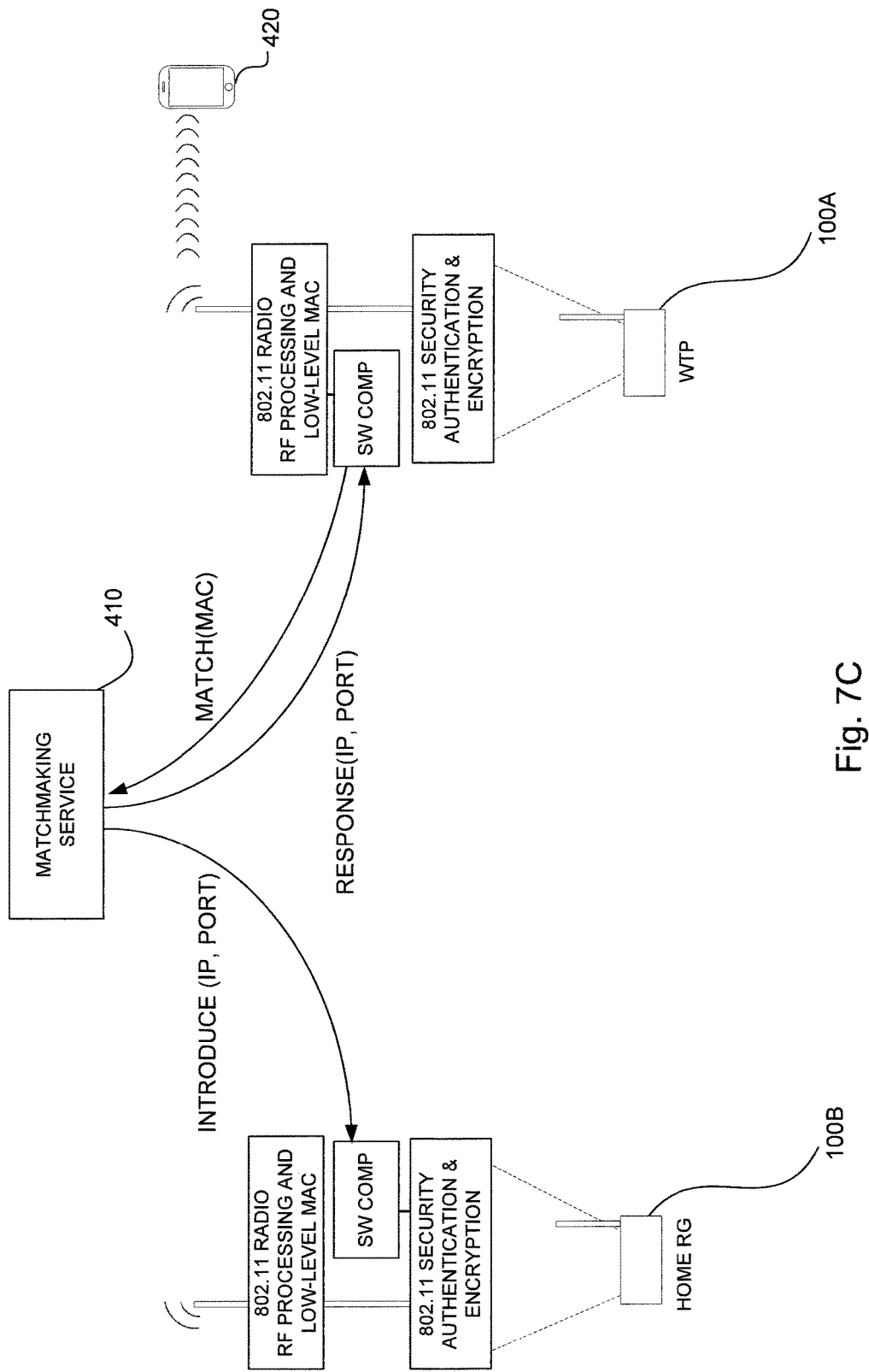

When said service provider request is received by a radio front-end 100A elsewhere in the network said radio front-end sends a Match message containing the MAC address of the device to the cloud-based matchmaking service. Said Match message comprises request information from the service provider request. The matchmaking service 410 searches its database to find a Binding associated with said MAC address. If such a Binding is found the matchmaking service introduces the back-end 100B associated with the Binding to the front-end 100A with an introduction message, containing an IP address and a port. A Match response message is then sent to the front-end 100A to enable a data tunnel to be established. Said Match response message may further comprise a policy message. See FIG. 7C.

Now whenever a user comes close to a radio front-end 100A, be it a public access point, residential gateway or consumer Wi-Fi router, his mobile device 420 will automatically connect to the user's home Wi-Fi exactly as if he was at home. To accomplish this feat the radio front-end 100A must connect to the tunnel termination back-end 100B in the user's home gateway to form a complete IEEE 802.11 stack, and the resulting Wi-Fi network must from the user's device's point of view be indistinguishable from his regular home Wi-Fi. Due to the inventive reasoning made by the inventors this can be performed in a fast and efficient manner, and so quickly that the device doesn't even notice.

Figure 7D:
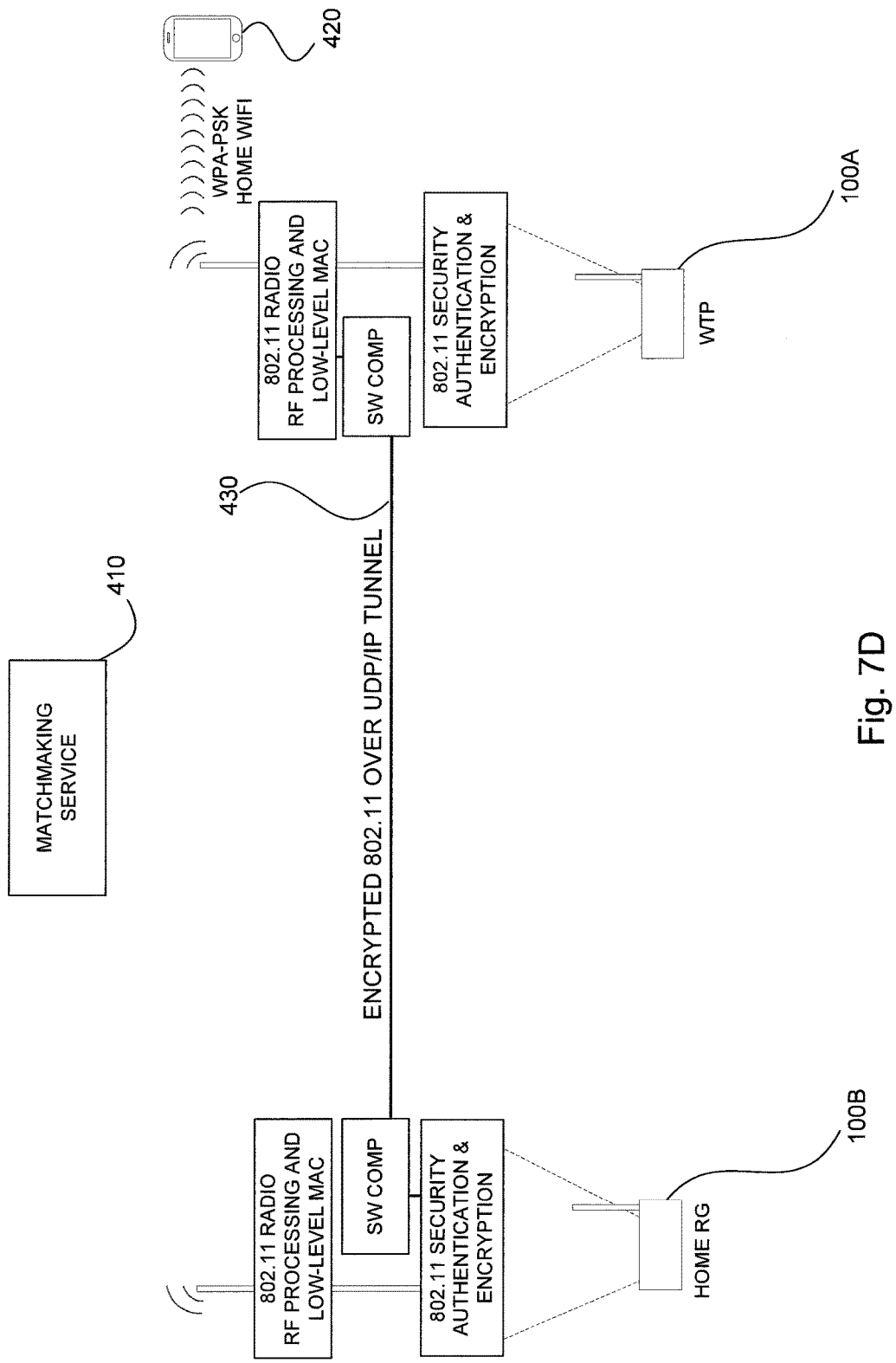

Once the introduction has been made encrypted Wi-Fi over IP traffic flows directly between the client device 420 and the tunnel termination back-end 100B, using the radio front-end 100A as the wireless termination point. See FIG. 7D.

The control plane (see FIG. 6) connects radio front-ends 100A and tunnel termination back-ends 100B to the cloud-based matchmaking service 410 through a light-weight UDP/IP protocol, in many ways similar to DNS. The control plane is used to coordinate front-ends and back-ends to form complete Wi-Fi stacks on demand. Below some more details on some of the features of the control plane protocol are disclosed.

The control plane provides a mechanism for fine-grained control of network visibility. Visibility decisions can be made both on a per mobile device 420 and per radio front-end basis, by simply choosing when to present a network to a mobile device.

A decision to present a network is encoded by the matchmaking service 410 as a network visibility policy and sent to the radio front-end 100a in a UDP packet. Network visibility policies controlling the visibility of several networks may be included in the same message and are here collectively referred to as a visibility policy. The front-end 100A matches the estimated properties of a hypothetical future connection against the policy to decide if to allocate a virtual BSS (Basic Service Set) on the Wireless Termination Point or not. The network visibility policy can e.g. contain a minimum signal level threshold, henceforth referred to as Signal-Level, and thresholds for the estimated upstream and downstream capacities of a connection (taking both spare backhaul and radio spectrum into account), henceforth referred to as Upload-Capacity and Download-Capacity.

Note that not allocating a virtual BSS (Basic Service Set) is only one method of enforcing a network visibility policy.

One method of enforcing a network visibility policy is not sending IEEE 802.11 Probe Response frames that are associated with the network and an IEEE 802.11 Probe Request frame received from the mobile device 420, whereby the mobile device 420 does not receive an IEEE 802.11 Probe Response frame and may assume that the network is not available.

One method of enforcing a network visibility policy is not sending an IEEE 802.11 Authentication frame in response to an IEEE 802.11 Authentication frame received from the mobile device 420.

One method of enforcing a network visibility policy is sending an IEEE 802.11 Authentication frame with an IEEE 802.11 Status code indicating an error in response to an IEEE 802.11 Authentication frame received from the mobile device 420.

One method of enforcing a network visibility policy is not sending an IEEE 802.11 Association Response frame in response to an IEEE 802.11 Association Request frame received from the mobile device 420.

One method of enforcing a network visibility policy is sending an IEEE 802.11 Association Response frame with IEEE 802.11 Status code indicating an error in response to an IEEE 802.11 Association Request frame received from the mobile device 420.

Another method of enforcing a network visibility policy is sending to the mobile device 420 an IEEE 802.11 Disassociation frame and/or an IEEE 802.11 Deauthentication frame. This method can be used to disconnect a mobile device also after it has connected.

Some examples of functionality that can be accomplished by selectively presenting networks are provided below.

Block a distant STA, by not showing or suppressing the visibility of, a WiFi network with a very faint or low signal level. A faint signal level is a level at which data communication at high quality and/or speed can not be guaranteed. The requirements for speed and/or quality are application specific and a complete list would be too exhaustive to include in a patent application.

Only show a WiFi network if the available capacity that can be dedicated to a mobile communication terminal is high enough. It is possible to configure a minimum radio link quality that must be attained before a network is presented to the mobile device. This avoids the common problem of mobile devices with alternate access methods switching over to a low quality Wi-Fi network. It is also possible to consider the Wireless Termination Point's available spare capacity, radio spectrum and backhaul, and only making the mobile devices preferred network available if these spare resources are adequate for a high quality user experience.

Block service when in the vicinity of the user's own home Wi-Fi network, that is to only show alternative services if the mobile device is outside the range of the Wi-Fi radio in their own Wi-Fi router or residential gateway. There are cases when a device may roam onto a neighbouring Wireless Termination Point (WTP) even though there is a direct radio link between the device and the Tunnel Termination Point (TTP). The technology disclosed herein tunnel termination back-end software implements some functionality to avoid this; specifically the TTP refusing to communicate with a mobile device through a Wi-Fi over IP tunnel if the same device can be heard on the a radio interface of the TTP.

Block service when the device is highly mobile. Wi-Fi is perfect for so-called nomadic use-cases, but less well adapted for truly mobile use-cases such as when the user is traveling in a car. The cloud-based matchmaking service can in these cases instruct the radio front-end to delay the presentation of highly mobile devices' preferred networks, in effect limiting service to stationary or nomadic use-cases.

Band steering. Band steering increases overall throughput by steering capable client devices from the 2.4 GHz band to the less crowded 5.8 GHz band. The cloud-based matchmaking service can trivially accomplish this by instructing radio front-ends operating in the 2.4 GHz band to delay the presentation of the network when the request is coming from a 5.8 GHz capable device and there is a 5.8 GHz radio front-end within range.

It should be noted in this context that the matchmaking service can deduce the radio frequency capability of most mobile devices by simply analyzing request information coming in from radio front-ends: if a service provider request from the mobile device has previously been received by a radio front-end operating in e.g. the 5.8 GHz band then the matchmaking service can safely assume that the device is capable of operating in the 5.8 GHz band. Since the matchmaking service has knowledge about service provider requests received by many radio front-ends, some of which may primarily be serving different networks, it is in advantageous position to deduce properties that remain constant across networks.

Graceful degradation under tunnel termination overload. Many Wi-Fi over IP tunnels are terminated in a single location, e.g. a mobile network core, it is not uncommon that the back-end infrastructure, e.g. tunnel termination gateways, IEEE 802.1X authenticators and AAA-servers, is overloaded. In a legacy Wi-Fi environment this may lead to long authentication delays and similar problems. With the technology disclosed herein it is possible to instead gradually increase minimum radio link quality requirements until the back-end infrastructure is able to cope. Tunnel termination back-ends simply report network load, system load and authentication interface load to the matchmaking service. The matchmaking service in response increases the radio link quality requirements encoded in visibility policies, thereby ensuring the best use of network assets and maximizes quality of experience.

In one embodiment the tunnel termination back-end may also update the visibility policy employed by a radio front-end to which it is directly connected. This may be useful when suppressing remote connections if the device is in close proximity to the home Wi-Fi network.

Selective offload based on the mobile communication terminal brand, that is to only show a WiFi network if the mobile communication terminal is of a specific type or brand based on for example the MAC address OUI.

Selective offload based on cellular capacity, that is to only show a WiFi network if the cellular capacity of the mobile communication terminal is at a low level. Again a low level being application specific. Tables 1 and 2 show examples of network visibility policies and visibility conditions.

In one embodiment a radio front-end that detects the presence of a STA will send a small UDP/IP datagram to the matchmaking service containing the MAC address of the STA. At this time the matchmaking service also sends a visibility policy to the radio front-end. The visibility policy contains a set of rules controlling the network visibility and a time duration indicating when the policy is valid. When a policy expires the radio front-end must request a new policy before taking any visibility decisions. The matchmaking service is however free to push out new visibility policies to radio front-ends at any time.

By using a low policy validity value in the response from the matchmaking service, it is possible to integrate tightly with a cellular network. In this case arbitrarily complex visibility decisions can be made based on many different metrics from both the Wi-Fi network and the cellular network, such as estimates of STA velocity and the load on cell that the STA is in. The key property that makes this possible is that a central entity (e.g. the matchmaking service) with knowledge of both the Wi-Fi network metrics and the cellular network metrics has ultimate control over the Wi-Fi network visibility on a per-STA and per-access point granularity.

The tunnel termination back-end may also update the visibility policy on connected radio front-end. This is useful when suppressing remote connections if the STA is in close proximity to the home Wi-Fi network. In this case the matchmaking service should generates visibility policy rules setting the initial visibility of said network to false and instructing the radio front-end to connect to the back-end immediately without waiting for a connection attempt from the mobile device, effectively transferring visibility control to the tunnel termination back-end.

At this point however the Wi-Fi over IP tunnel to the tunnel termination back-end is normally not yet established—tunnel setup is deferred until the device attempts to associate with the Wi-Fi network. Resource de-allocation follows a similar early release scheme.

This just-in-time resource allocation scheme ensures that tunnel termination back-end load scales with the number of mobile devices served, and not with the number of radio front-ends 100A in the network.

Tunnel termination back-ends 100B periodically send a load indication message to the cloud-based matchmaking service. This load indication can be used to limit the rate of new tunnels to the back-end. When the tunnel termination resources of a virtual Wi-Fi network become overloaded the matchmaking service will prioritize tunnels originating from access points with a high quality radio link to the mobile device, thereby ensuring that available resources are used to maximum possible benefit.

Several tunnel termination back-ends 100B may also be configured with identical network identifiers, e.g. a UUID, and Wi-Fi network properties. In this case the matchmaking service will automatically distribute Wi-Fi over IP connections across available back-ends. This mechanism can be used to load balance across several tunnel termination gateways.

If multiple tunnel termination back-ends 100B are used to terminate the same Wi-Fi network this will also provide redundancy and automatic failover. Should a tunnel termination gateway 100B suffer a failure, the radio front-ends 100A connected to it will close the connection and de-allocate their corresponding virtual BSSes. When a mobile device re-associates to the network the matchmaking service 410 will introduce the radio front-end 100A to a tunnel termination back-end 100B running on another tunnel termination gateway 430. The end result is a glitch in connectivity that lasts less than a minute and only affects the STAs that were served by the failing tunnel termination gateway. STA is IEEE 802.11 terminology which is used to denote a station such as a mobile communications terminal, a mobile communications device, or an access point in some circumstances.

NAT (Network Address Translation) traversal may be used as part of the design. Both the radio front-end software and the tunnel termination back-end software can be deployed behind NAT with so-called cone properties.

Figure 8:
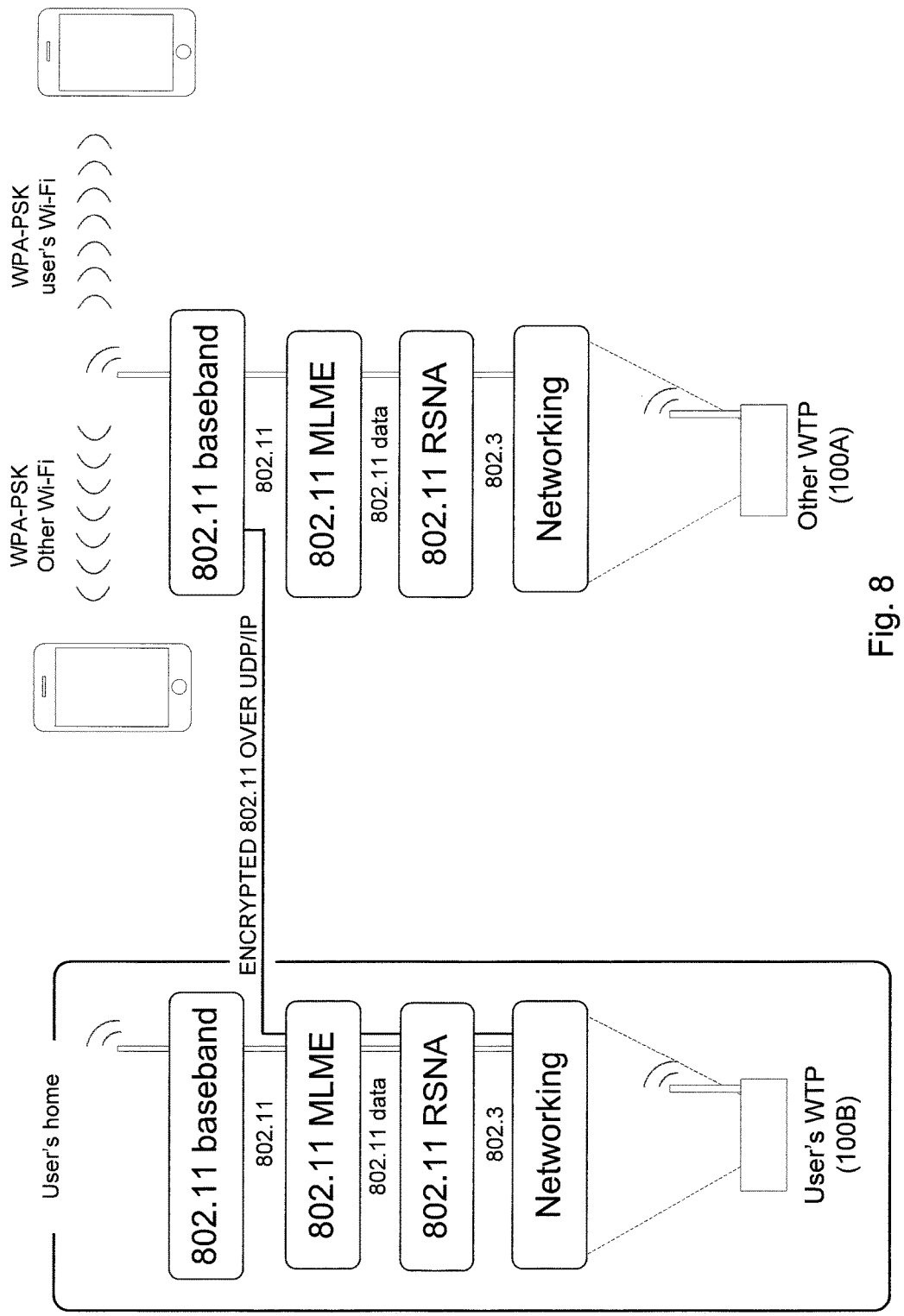
FIG. 8 shows a schematic view of a communication system according to one embodiment of the teachings of this application.

A user data plane connects a radio front-end 100A to a tunnel termination back-end 100B through a Wi-Fi over IP tunnel 430. Wi-Fi over IP relates to a specific implementation: IEEE 802.11 frames coming in on the radio are encapsulated in a thin UDP/IP header and sent out over a network backhaul (not shown explicitly, but well-known to a skilled person). In the opposite direction UDP/IP packets coming in over the backhaul connection carry IEEE 802.11 frames ready to be sent out over the radio interface. FIGS. 8 and 9 shows a schematic view of the user data plane.

When the tunnel termination software runs on a residential gateway or consumer Wi-Fi router the standard WPA/WPA2 4-way handshake goes all the way from the mobile device to the user's home, where the device is authenticated using the passphrase stored in the tunnel termination point (TTP). Since this passphrase was entered into the device (or transferred to the device using Wi-Fi Protected Setup) when it was first connected to the Wi-Fi network no user interaction is necessary for authentication, not even the first time a device connects through a Wi-Fi over IP tunnel. Also, since the passphrase is only available in the mobile device and at the tunnel termination point (TTP) the mutual authentication property of the WPA-PSK security mechanism ensures that the end-user is in fact connected to their own network, and not to a rogue access point. This is a benefit of this specific implementation, see FIG. 8.

When the tunnel termination software runs on a tunnel termination gateway the standard WPA/WPA2 4-way handshake goes all the way from the mobile device to the tunnel termination gateway where the IEEE 802.1X authenticator can verify the identity of the subscriber using an EAP based security mechanism. This mechanism can be EAP-SIM, EAP-AKA, EAP-AKA' or any other mechanism supported by the AAA-server. Note that with this architecture the RADIUS interface is only used to connect the tunnel termination gateway to the AAA-server within a trusted network environment. This combined with the mutual authentication property of the security mechanism ensures that the end-user is in fact connected to their operator's network, and not to a rogue access point, see FIG. 9.

Figure 10:
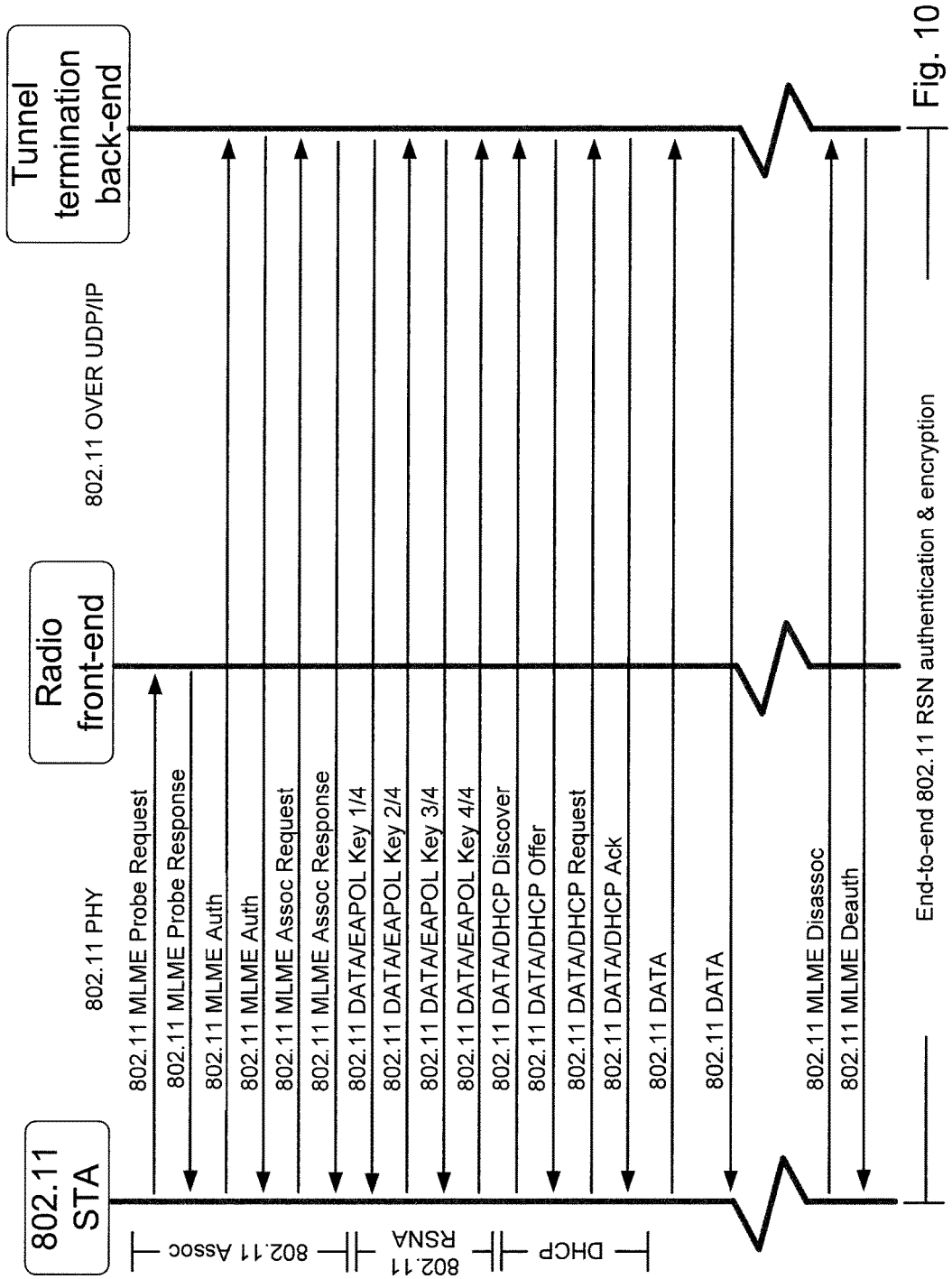
FIG. 10 shows a time graph of the messages sent between the various entities of a network or system arranged according to one embodiment of the teachings of this application.

FIG. 10 shows a time graph of the messages sent between the various entities of a network or system arranged according to the teachings and the technology herein and gives an illustration of the association and authentication process. Note that the technology disclosed herein does not in any way alter this process, it merely tunnels the Wi-Fi frames over UDP/IP.

Since the 4-way handshake runs all the way from the mobile device to the tunnel termination back-end the encryption keys are also derived only in these two places. This architecture ensures user data integrity and data confidentiality end-to-end, all the way from the mobile device to the tunnel termination back-end thereby providing an improved security.

As stated in the background section, it may seem that a simple fixed bandwidth limit for mobile devices would be sufficient but this is unfortunately not the case. The average radio link quality for mobile devices tends to be quite low and large amounts of spectrum are therefore consumed even at modest throughput. Unless radio resources are carefully managed a mobile device can severely impact the user experience of a residential subscriber even at low data rates.

For example, it would not be uncommon for a mobile device to have such a low quality radio link that its maximum unthrottled throughput would be just 1 Mbps, or even less. A primary user of the WTP that normally enjoys throughput of up to 50 Mbps would then be severely impacted even if mobile bandwidth use is quite low. Table 3 and table 4 provide some examples.

The technology disclosed herein takes both backhaul and spectrum use into account and recalculates bandwidth limits for mobile STAs many times per minute. The result is the best possible mobile user experience with no impact to the primary function of the WTP. Table 2 provides some examples of such calculated bandwidth limits.

Handover from WTP to WTP is handled through the standard IEEE 802.11 mechanism, i.e. the mobile device periodically scans for new access points. It is however possible to restrict the mobile devices choice of WTP through the visibility policy mechanism. This leads to a hybrid between client controlled and infrastructure controlled handover, access point selection is not fully controlled but instead moderated.

The tunnel termination back-end portion of the technology disclosed herein implements a number of mechanisms that can be used to create advanced mobile Wi-Fi services.

The technology herein has been devised to protect the primary function of the residential gateway, i.e. the fixed-line subscriber's use of the connection. A radio front-end software or firmware according to the technology disclosed herein carefully monitors the fixed-line subscriber's use of both backhaul and radio resources. When there is a risk that a mobile user may in any way impact the primary function the mobile user will be throttled, both in the downstream and upstream direction, to prevent such impact. We call this spectrum aware traffic prioritization.

A number of benefits follow from utilizing the technology herein and translate into a superior user experience, as well as a scalable and economical solution for the operator.

No client-side software—the subscriber does not need to install any additional software on their device, or anywhere else.

Advanced traffic prioritization—mobile users are automatically throttled to ensure that the user experience of the local subscriber is not in any way impacted. Both backhaul bandwidth and spectrum use are taken into account.

Strong mutual authentication—the device is of course authenticated to the network, but the network is also authenticated to the device. The subscriber can be sure that they are in fact connected to their own home Wi-Fi network (through a Wi-Fi over IP tunnel) and not to a rogue access point.

Full mobility with fast handover—since Wi-Fi over IP tunnels are always terminated at the same place devices stay connected to the same Layer 2 network when roaming from one visited gateway to another. This means that handovers are completely seamless and that traffic traceability and other regulatory requirements are met. It also means that encryption keys derived using EAP-SIM or AKA can be cached in one secure place and reused, ensuring fast handover and reduced load on the operator's authentication infrastructure.

Infinite scalability—the Wi-Fi over IP tunnels are peer-to-peer and neither data nor signaling traffic passes through any central location. In effect you are leveraging an immense distributed system to handle tunnel termination and authentication. Also, access points do not connect to the tunnel termination gateway (TTG) until a mobile device is ready to use the service. The architecture therefore scales with the number of mobile devices, and not with the number of access points. Load balancing between tunnel termination gateways ensures scalability up to hundreds of millions of mobile devices and the visibility policy mechanism can be used to select for offload only those devices that will benefit the most.

Advanced quality of experience management—the visibility policy mechanism makes it possible to improve the average perceived quality of a user session. Due to the small coverage area of each access point carrier Wi-Fi networks tend to be less continuous and more patchy in nature. Combined with most mobile device's propensity to connect to a Wi-Fi network as soon as it can be detected this leads simple geometry dictates that the average session quality will be relatively poor (since a large portion of the area of a circle is close to the edge and most of the coverage of a patchy network is thus fringe coverage). It is therefore possible to dramatically increase the average session quality by simply not presenting a network to the mobile device in cases where the estimated quality of a potential session is below a threshold value.

In this example we show how a fixed-line operator can leverage the technology disclosed herein to securely offload mobile data onto Wi-Fi with authentication directly against the SIM card. Since the standard WPA/WPA2 Enterprise security mechanism protects the communication end-to-end, over both air and wire, existing Wi-Fi assets such as residential gateways and third party access points can be securely leveraged, even if their physical security cannot be guaranteed.

While it is of course possible to cooperate with a third party such as a local Wireless Internet Service Provider (WISP) or municipal Wi-Fi network and buy the necessary radio access capacity through the exchange platform we here concentrate on the case where the operator can provide coverage by leveraging their own installed base of Wi-Fi equipped residential gateways.

Figure 11:
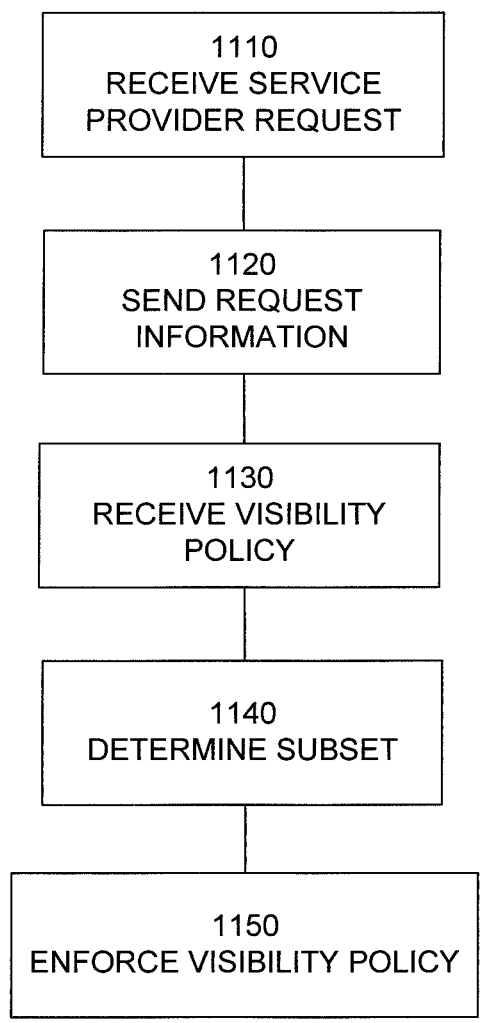
FIG. 11 shows a general flow chart according to a method according to one embodiment of the teachings of this application.

FIG. 11 shows a general flow chart according to a method according to one embodiment of the teachings of this application. The method is for use in front-end network communications device, arranged to operate as an access point 100A, 104, for establishing a data connection 430 between a mobile communications terminal 102, 420 and one or more data communications networks 108, 400 or alternatively to a back-end network communications device 100B. The front-end network communications device receives 1110, from the mobile communications terminal (102, 420), a service provider request comprising a MAC address of the mobile communications terminal (102, 420) and sends 1120, to a master server (310, 410), request information pertaining to the service provider request. In one embodiment the service provider request is received in a Probe Request frame. In one embodiment the service provider request is received in an Authentication frame. In one embodiment the service provider request is received in an Association Request frame.

The front-end network communications device further receives 1130, from the master server 310, 410, a policy message comprising a visibility policy, the visibility policy containing rules for controlling the visibility of at least one of the one or more data communications networks, and determines 1140 a subset of communications networks 108, 400 that should be visible to the mobile communications terminal 102, 420 based on the rules. The front-end network communications device enforces 1150 the visibility policy by allowing the mobile communications terminal 102, 420 to connect only to the subset of data communications networks 108, 400 the network selection of the mobile communications terminal 102, 420 is moderated.

The visibility policy may be enforced in a number of alternative manners. Such manners may be combined or used exclusively. In one embodiment the visibility policy is enforced by sending to the mobile communications terminal 102, 420 only those Probe Response frames that are associated with a data communications network that belongs to the subset. In one embodiment the visibility policy is enforced by sending to the mobile communications terminal 102, 420 an Authentication frame containing a status code indicating success if the associated data communications network belongs to the subset and a status code indicating an error otherwise. In one embodiment the visibility is enforced by only sending to the mobile communications terminal 102, 420 an Authentication frame if the associated data communications network belongs to the subset. In one embodiment the visibility policy is enforced by sending to the mobile communications terminal 102, 420 an Association Response frame containing a status code indicating success if the associated data communications network belongs to the subset and a status code indicating an error otherwise. In one embodiment visibility is enforced by only sending to the mobile communications terminal 102, 420 an Association Response frame if the associated data communications network belongs to the subset.

The front-end network communications device is thus able to enable a moderation of the network selection of the mobile communications terminal 102, 420.

In one embodiment the subset may be updated and the visibility policy may then be enforced at any time also after the data connection 430 has been established, by sending to the mobile communications terminal 102, 420 a Disassociation and/or Deauthentication frame if the data connection 430 connects the mobile communications terminal 102, 420 to a data communications network that no longer belongs to the subset.

In one preferred embodiment the Probe Request frame is an IEEE 802.11 Probe Request frame, the Probe Response frames are IEEE 802.11 Probe Response frames, the Authentication frame is an IEEE 802.11 Authentication frame, the Association Request frame is an IEEE 802.11 Association Request frame or an IEEE 802.11 Reassociation Request frame, the Association Response frame is an IEEE 802.11 Association Response frame or an IEEE 802.11 Reassociation Response frame, the Disassociation frame is an IEEE 802.11 Disassociation frame, the Deauthentication frame is an IEEE 802.11 Deauthentication frame and the status code is an IEEE 802.11 Status code.

It may also be possible to set a time period during which a visibility policy is valid. In such an embodiment the policy message contains a validity duration or expiry time for the visibility policy and wherein the front-end network communications device 100A, 104 stores the visibility policy in its memory for the validity duration or until the expiry time.

The visibility policy may be based on a number of conditions gathered from the data communications networks. Such conditions are given in table 2 and may be included in the request information. As can be seen in table 2, the conditions are dynamic and related to a threshold value or limit. In such an embodiment the rules further comprise a time duration during which the conditions must be met before the associated data communications network is determined to belong to the subset.

The visibility policy may also be determined based on further comprising sending information related to operating radio frequency, IEEE 802.11 Beacon frames received, spectrum load, network load, system load and/or network selection to the master server 310, 410 to take into account other network parameters and conditions.

In one embodiment the master server determines the visibility policy rules. The visibility policy rules may be determined in a number of alternative manners that may be combined.

In one embodiment the visibility policy rules are generated based on the MAC address of the mobile communications terminal 102, 420. In one embodiment the visibility policy rules are generated based on the previous network selection of the mobile communications terminal 102, 420. In one embodiment the visibility policy rules are generated based on an identifier for the front-end network communications device 100A, 104 included in the request information. In one embodiment the visibility policy rules are generated based on the location of the front-end network communications device 100A, 104 and the current load on a cellular network in that location. In one embodiment the visibility policy rules are based on the radio frequency capability of the mobile communications terminal 102, 420 and the current operating frequency of the front-end network communications device 100A, 104. In one embodiment the radio frequency capability of the mobile communications terminal 102, 420 is estimated based on request information previously received.

In one embodiment the communication network 108, 400 further comprises at least one back-end network communications device 100B and control of the visibility policy may be transferred to at least one of the at least one back-end network communications devices whereby the back-end network communications device transmits the policy message to the front-end network communication device 100A, 104.

The at least one back-end network communication device 100B may also be configured to transmit data related to network selection, network load, system load and/or authentication load to the master server 310, 410 and wherein the master server 310, 410 generates the visibility policy rules based on the information provided by the back-end network communication device 100B possibly in combination with one or more of the alternative manners mentioned above.

It should be noted that one priority is to protect the primary function of the residential gateway, i.e. the fixed-line subscriber's use of the connection. In the embodiment disclosed herein the radio front-end software in the residential gateway carefully monitors the fixed-line subscriber's use of both backhaul and radio resources. When there is a risk that a mobile subscriber may in any way impact the primary function the mobile subscriber will be throttled, both in the downstream and upstream direction, to prevent such impact. We call this spectrum aware traffic prioritization.

Spectrum aware traffic prioritization protects the primary function but may in turn negatively impact the mobile user's experience. It is therefore important to take the result of throttling into account when making network visibility decisions. The inventors have determined through experimentation that one advantageous method is to estimate, before connection establishment, the upstream and downstream bandwidth that would be available to a mobile device if it was to connect, and to compare these estimates with corresponding limits received from the master server, as part of a visibility policy. Estimating the radio link quality based on only a small number of packet exchanges is however not straightforward. Through experimentation the inventors have determined two approaches to approximate the spectrum use (in seconds of radio transmission) per byte transferred:

One method of approximating the spectrum use per byte is to calculate from the Received Signal Strength Indication (RSSI) an ideal throughput, and from that a minimum bound on the spectrum use per byte.

One method of approximating the spectrum use per byte is to send to the mobile device an IEEE 802.11 Ready-to-Send (RTS) frame and listen for an IEEE 802.11 Clear-to-Send (CTS) frame in reply. Since all IEEE 802.11 compliant STAs will respond to an RTS frame with CTS this approach makes it possible to probe the packet error rate at various bitrates and calculate spectrum use per byte. This method also has the added advantage of collecting additional RSSI samples that can be used to prove the accuracy of the Signal-Level measurement.

In practice the former method is however often sufficient, since the exactness of the result is only meaningful when close to the limit set by the visibility policy and because the goal is to increase the average session quality in a statistical sense. Furthermore, any error in estimation is in real world applications often engulfed by changes in circumstances. For example the mobile device may move significantly after connection establishment.

The Upload-Capacity and Download-Capacity shall thus be interpreted as estimates of bandwidth available to a mobile device once connected, taking both backhaul bandwidth, available spectrum and radio link quality into account.

SIM authentication with EAP-SIM/AKA has been a part of the Wi-Fi standard for some time, and with recent initiatives by the Wi-Fi Alliance and the Wireless Broadband Alliance (WBA) device support is set to accelerate. On most devices, e.g. all Apple® devices, a seamless user experience can be achieved.

The technology disclosed herein adds to the user experience in important ways. The technology disclosed herein allows the operator to only offload mobile devices to Wi-Fi when the radio link between device and access point meets some minimum quality requirement and to fail gracefully when tunnel termination or IEEE 802.1X authentication resources become a limiting factor.

The operator can also manage the quality of experience dynamically through the visibility policy mechanism, e.g. ensuring that only the devices with a high data volume usage pattern or a certain type of data plan are presented with the operator branded and EAP-SIM/AKA authenticated Wi-Fi network.

Many consumer Wi-Fi routers and most corporate WLAN systems come with a guest access solution, usually implemented as an insecure open network with a separate SSID. The technology disclosed herein makes it possible to also provide guests with remote access to their own secure Wi-Fi networks, through a Wi-Fi over IP tunnel. In a corporate environment this functionality can be used e.g. to provide employees access to their own home Wi-Fi, easing the load on IT support for providing Internet access when employees bring their own devices into the workplace. When combined with the monetization and exchange platform it can also be used to let mobile operators offload data onto a corporate WLAN, using only spare radio spectrum and backhaul. In a residential setting the technology can be used to provide employees with remote access to the corporate WLAN network. A consumer Wi-Fi router can easily be configured to connect to a tunnel termination gateway installed in a corporate data center by simply associating them with the same Account. The result is a virtual Remote Access Point (vRAP), providing seamless and secure access to the corporate WLAN from the home. An operator with the technology disclosed herein integrated in residential gateways could provide the same virtual Remote Access Point (vRAP) functionality as a service.

Other benefits includes that the technology herein can be used to realize many use-cases, but the most interesting have a core user experience in common: there is no software to install on the device, no registration process, and no usernames or passwords to remember or enter. Advanced spectrum aware traffic prioritization safeguards the quality of experience for all parties. Further benefits are discussed in the below.

With the technology herein there is no additional software that needs to be installed on the device. From the device's point of view it's all standard Wi-Fi.

With many prior art hotspot solutions the end-user is often required to register an account on a website before they can access the wireless network. With the technology herein this manual registration step can often be avoided since pre-existing credentials are used for subscriber identification and authentication.

An access point with support for the technology herein often has another primary function: it may e.g. serve as the residential gateway for a fixed-line broadband subscriber. Software according to herein carefully measures and throttles mobile devices to ensure that traffic on a Primary BSS is always prioritized and that the fixed-line subscriber's user experience is minimally impacted. Both backhaul bandwidth and radio spectrum are taken into account.

The invention has mainly been described above with reference to a few embodiments. However, as is readily appreciated by a person skilled in the art, other embodiments than the ones disclosed above are equally possible within the scope of the invention, as defined by the appended patent claims.

TABLE 1

Examples of selective network visibility policies.

| Field | Value | Interpretation |
|---|---|---|
| Radio | MAC address | The radio front-end this policy applies to. |
| Network | UUID | The network this policy applies to. |
| STA | MAC address | The MAC address of the STA this policy applies to. If the MAC address is the broadcast address the policy applies to all STAs. |
| Duration | Time | The validity duration time of the policy. |
| ConnectFirst | Boolean | True to connect to the back- |

TABLE 1-continued

Examples of selective network visibility policies.

| Field | Value | Interpretation |
|---|---|---|
| Visibility | Expression | end before answering any requests from the STA, effectively transferring visibility control to the back-end. If set to False the default just-in-time connection scheme is used. Any logical combination of visibility conditions, examples of which are listed in Table 2. |

TABLE 2

Examples of selective network visibility conditions.

| Condition | Parameter | Interpretation |
|---|---|---|
| Signal-Level | Signal level threshold | True if the STA signal level is above the threshold, False otherwise. |
| Download-Capacity | Bandwidth threshold | True if the estimated download capacity for the STA is above the threshold, False otherwise. |
| Upload-Capacity | Bandwidth threshold | True if the estimated upload capacity for the STA is above the threshold, False otherwise. |

TABLE 3

Mobile user throughput and associated impact on a residential subscriber without spectrum aware prioritization.

| Mobile device throughput | Potential impact on primary function of WTP |
|---|---|
| 0.25 Mbps | Max throughput decreases from 50 Mbps to 35 Mbps |
| 0.5 Mbps | Max throughput decreases from 50 Mbps to 18 Mbps |
| 0.75 Mbps | Max throughput decreases from 50 Mbps to 1 Mbps |

TABLE 4

Examples of local STA bandwidth use and dynamically calculated limits for a mobile STA with a poor radio link.

| Local STA throughput | Mobile STA throughput limit |
|---|---|
| 0 Mbps | No throttling of mobile STA |
| 0.1 Mbps | Mobile STA throttled to 0.5 Mbps |
| 47 Mbps | Mobile STA throttled to 0.05 Mbps |

The invention claimed is:

1. A method for use in a front-end network communications device, arranged to operate as an access point, (100 A, 104) for establishing a moderated data connection (430) based on dynamic network conditions between a mobile communications terminal (102, 420) and one or more data communications networks (108, 400), said method comprising:

receiving, from the mobile communications terminal (102, 420), a service provider request comprising a MAC address of the mobile communications terminal (102, 420);

sending, to a master server (310, 410), request information pertaining to the service provider request;

receiving, from the master server (310, 410), a policy message comprising a visibility policy, said visibility policy containing rules for controlling the visibility of at least one of the one or more data communications networks;

determining a subset of communications networks (108, 400) that should be visible to the mobile communications terminal (102, 420) based on said rules; and enforcing said visibility policy by allowing said mobile communications terminal (102, 420) to connect only to said subset of data communications networks (108, 400), whereby the network selection of said mobile communications terminal (102, 420) is moderated, and wherein at least one of:
said rules comprise one or more limits and one or more dynamic conditions related to Signal-Level, Download-Capacity and/or Upload Capacity; and
said request information further comprises Signal-Level, Download-Capacity and/or Upload Capacity.

2. The method according to claim 1, wherein said service provider request is received in an IEEE 802.11 Probe Request frame.

3. The method according to claim 1, wherein said visibility policy is enforced by sending to said mobile communications terminal (102, 420) only IEEE 802.11 Probe Response frames that are associated with a data communications network that belongs to said subset.

4. The method according to claim 1, wherein said service provider request is received in an IEEE 802.11 Authentication frame.

5. The method according to claim 1, wherein said visibility policy is enforced by sending to said mobile communications terminal (102, 420) an IEEE 802.11 Authentication frame containing a status code indicating success if the associated data communications network belongs to said subset and a status code indicating an error otherwise.

6. The method according to claim 1, wherein said visibility is enforced by only sending to said mobile communications terminal (102, 420) an IEEE 802.11 Authentication frame if the associated data communications network belongs to said subset.

7. The method according to claim 1, wherein said service provider request is received in an IEEE 802.11 Association Request frame.

8. The method according to claim 1, wherein said visibility policy is enforced by sending to said mobile communications terminal (102, 420) an IEEE 802.11 Association Response frame containing a status code indicating success if the associated data communications network belongs to said subset and a status code indicating an error otherwise.

9. The method according to claim 1, wherein said visibility is enforced by only sending to said mobile communications terminal (102, 420) an IEEE 802.11 Association Response frame if the associated data communications network belongs to said subset.

10. The method according to claim 1, further comprising updating said subset and enforcing said visibility policy at any time, also after, said data connection (430) has been established, by sending to said mobile communications terminal (102, 420) an IEEE 802.11 Disassociation and/or Deauthentication frame if said data connection (430) connects said mobile communications terminal (102, 420) to a data communications network that no longer belongs to said subset.

11. The method according to claim 1, wherein said policy message contains a validity duration or expiry time for said visibility policy and wherein said front-end network communications device (100 A, 104) stores said visibility policy in its memory for said validity duration or until said expiry time.

12. The method according to claim 1, further comprising receiving a policy message at any time also after said data connection (430) has been established.

13. The method according to claim 1, wherein said rules comprise one or more limits and one or more dynamic conditions related to Signal-Level, Download-Capacity and/or Upload Capacity and wherein said rules further comprise a time duration during which said dynamic conditions must be met before the associated data communications network is determined to belong to said subset.

14. The method according to any of claim 1, further comprising sending information related to operating radio frequency, IEEE 802.11 Beacon frames received, spectrum load, network load, system load and/or network selection to said master server (310, 410).

15. The method of claim 1, wherein the visibility rules govern when to present a network to a mobile device.

16. The method of claim 1, wherein the subset of communications networks comprises a plurality of communications networks.

17. The method of claim 1, wherein the method takes place independent of at least one of wireless authentication and authorization.

18. The method of claim 1, further comprising at least one of authenticating and authorizing the device to one of the networks of the subset of data communications.

19. A method for use in a communications network (108, 400), comprising a master server (410, 310) and a plurality of front-end network communications devices (100A, 104), for establishing a moderated data connection (430) based on dynamic network conditions between a mobile communications terminal (102, 420) and one or more data communications networks (108, 400), comprising
receiving, by at least one of the front-end network communications devices (100 A, 104) a service provider request comprising a MAC address of said mobile communications terminal (102, 420);
sending, by at least one of the front-end network communications devices (100A, 104) to the master server (310, 410) request information pertaining to the service provider request;
receiving, by the master server (310, 410) said request information;
generating, by the master server (310, 410) visibility policy rules based on the request information received from at least one of the front-end network communications devices (100A, 104);
sending, by the maser server (310, 410) to at least one of the front-end network communications devices (100A, 104) one or more policy messages comprising said visibility policy rules;
receiving, by at least one of the front-end network communications devices (100A, 104), said one or more policy messages;
determining, by each of said at least one of the front-end network communications devices (100 A, 104) based on said rules a subset of communications networks (108, 400) that should be visible to the mobile communications terminal (102, 420);
enforcing, by each of said at least one front-end network communications devices said visibility policy rules by allowing said mobile communications terminal (102, 420) to connect only to said subset of data communications networks (108, 400), whereby the network and access point selection of the mobile communications device (102, 420) is moderated.

20. The method according to claim 19, wherein said visibility policy rules are generated based on the MAC address of the mobile communications terminal (102, 420).

21. The method according to claim 19, wherein said visibility policy rules are generated based on the previous network selection of the mobile communications terminal (102, 420).

22. The method according to claim 19, wherein said visibility policy rules are generated based on an identifier for the front-end network communications device (100 A, 104) included in the request information.

23. A method for use in a master server (410, 310) arranged to be used in a communications network (108, 400) comprising a plurality of front-end network communications devices (100A, 104), for establishing moderated a data connection (430) based on dynamic network conditions between a mobile communications terminal (102, 420) and one or more data communications networks (108, 400), said method comprising:
receiving, from said at least one of the front-end network communications devices (100A, 104), request information pertaining to a service provider request received by said at least one of the front-end network communications devices (100A, 104) and said service provider request comprising a MAC address of said mobile communications terminal (102, 420);
generating visibility policy rules based on the request information received form at least one of the front-end network communications devices (100A, 104);
sending to the at least one of the front-end network communications devices (100A, 104) one for more policy messages comprising said visibility policy rules; and
thereby eliminating at least one of the front-end network communications devices (100A, 104), based on said one or more policy messages;
determining, by each of said at least one front-end network communications devices (100A, 104) a subset of communications networks (108, 400) that should be visible to the mobile communications terminal (102, 420) based on said rules, and
enforcing, by each of said at least one front end network communications devices said visibility policy rules by allowing said mobile communications terminal (102, 420) to connect only to said subset of data communications networks (108, 400),
whereby the network and access point selection of the mobile communications device (102, 420) is moderated, and
wherein at least one of:
said rules comprises one or more limits and one or more dynamic conditions related to Signal-Level, Download-Capacity and/or Upload-Capacity; and
said request information further comprises Signal-Level, Download-Capacity and/or Upload-Capacity.

* * * * *